US009891792B1

(12) United States Patent
Morin et al.

(10) Patent No.: US 9,891,792 B1
(45) Date of Patent: Feb. 13, 2018

(54) METHOD AND SYSTEM FOR BUILDING AND UTILIZING INTERACTIVE SOFTWARE SYSTEM PREDICTIVE MODELS USING BIOMETRIC DATA

(71) Applicant: Intuit Inc., Mountain View, CA (US)

(72) Inventors: Yao H. Morin, San Diego, CA (US); Vi Joy Caro, Chula Vista, CA (US); Massimo Mascaro, San Diego, CA (US); Luis Felipe Cabrera, Bellevue, WA (US); Amir Eftekhari, San Diego, CA (US); Nankun Huang, San Diego, CA (US); Damian O'Malley, San Diego, CA (US); Art Tawanghar, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 229 days.

(21) Appl. No.: 14/927,677

(22) Filed: Oct. 30, 2015

(51) Int. Cl.
*G06F 3/0484* (2013.01)
*G06F 17/30* (2006.01)
*H04L 29/08* (2006.01)

(52) U.S. Cl.
CPC ...... *G06F 3/0484* (2013.01); *G06F 17/30528* (2013.01); *G06F 17/30598* (2013.01); *H04L 67/22* (2013.01)

(58) Field of Classification Search
CPC combination set(s) only.
See application file for complete search history.

(56) References Cited

U.S. PATENT DOCUMENTS

| 6,922,488 | B2* | 7/2005 | Mastrianni | G06K 9/00221 382/199 |
| 8,768,313 | B2* | 7/2014 | Rodriguez | G06K 9/00986 382/118 |
| 9,355,650 | B2* | 5/2016 | Dimitriadis | G10L 25/63 |
| 9,378,065 | B2* | 6/2016 | Shear | G06F 9/5072 |
| 9,444,824 | B1* | 9/2016 | Balazs | H04L 63/105 |
| 9,648,171 | B1* | 5/2017 | Eftekhari | H04M 3/5232 |

* cited by examiner

*Primary Examiner* — Tsung-Yin Tsai
(74) *Attorney, Agent, or Firm* — Hawley Troxell Ennis & Hawley LLP; Philip McKay

(57) ABSTRACT

Biometric data is collected to obtain more detailed, connected, and reliable feedback data from users of an interactive software system that has a more empirical and objective basis. The biometric data is then used to create emotional pattern predictive model data representing emotional pattern predictive models associated with users of the interactive software system. The individual emotional pattern predictive models associated with multiple users of the interactive software system are then analyzed and processed to generate emotional pattern profile data for categories of users. These biometric data based predictive models are then used for targeted product diagnosis, targeted interventions, targeted marketing/upsell attempts, and grouping and analysis of feedback and user categories and feedback sources.

52 Claims, 3 Drawing Sheets

METHOD AND SYSTEM FOR BUILDING AND UTILIZING INTERACTIVE SOFTWARE SYSTEM PREDICTIVE MODELS USING BIOMETRIC DATA

BACKGROUND

Interactive software systems are diverse and valuable tools, providing services that were either never before available, or were previously available only through interaction with a human professional. For example, an interactive software system may provide tax preparation or financial management services. Prior to the advent of interactive software systems, a user would be required to consult with a tax preparation or financial management professional for services and the user would be limited, and potentially inconvenienced, by the hours during which the professional was available for consultation. Furthermore, the user might be required to travel to the professional's physical location. Beyond the inconveniences of scheduling and travel, the user would also be at the mercy of the professional's education, skill, personality, and varying moods. All of these factors resulted in a user experience vulnerable to human error and variations in human ability and temperament.

In contrast, interactive software systems offer many benefits, including, but not limited to: the interactive software system does not have limited working hours, is not geographically limited, and is not subject to human error or variations in human ability or temperament.

Although interactive software systems represent a potentially flexible, highly accessible, and affordable source of services, they do have several significant shortcomings. One significant shortcoming of currently available interactive software systems is that because there is generally no human service representative interaction with the user of the interactive software system, it is difficult to obtain the type of visual and verbal feedback that is associated with human interaction, e.g., with a human tax or financial management specialist. This lack of detailed feedback and real-time interaction can result in less than ideal interactive software system capabilities, support systems, and user experience.

For instance, the features and operation of any interactive software system must be updated and improved to meet the needs of its current users, and to attract new users. However, in order to improve the features and operation of an interactive software system, detailed feedback must be obtained from users regarding specific issues with specific features or operations. Consequently, it is crucial for product development and customer care teams associated with an interactive software system to gather customer feedback on the interactive software system to address any identified shortcomings in the interactive software system as soon as possible, and as accurately as possible. However, currently, interactive software systems, such as tax preparation systems, largely rely on surveys to gather product feedback. Unfortunately, survey-based product feedback has several drawbacks that limit its effectiveness including, but not limited to: insufficient detail regarding the issue encountered, why it is an issue, and what the user would like to see done; lack of focus and general comments that provide no connection between the feedback/comments and specific operations and/or features of the interactive software system; generally subjective and emotion driven feedback that does not provide enough detail regarding why the user dislikes a given feature or operation and what emotion the feature or operation provokes in the user; and the notoriously low user participation in the survey process due to its generally burdensome requirement to enter data after the interview and interaction with the interactive software system is complete.

Another shortcoming of currently available interactive software systems is the placement and utilization of customer support and intervention systems associated with traditional interactive software systems. These services are currently provided in a highly generic way with the support and/or intervention services being offered automatically, if at all, at points within the interactive software system where support is predicted to be desired based on a generic hypothetical user. However, given that almost no individual user of the interactive software system is likely to exactly match the generic hypothetical user, the result is that the types of customer support and intervention systems offered, and when they are offered, may not correspond to where, or why, an actual individual user is getting frustrated or confused. As a result, support and/or intervention services are often offered at irrelevant times and locations for any given user.

In addition, because they lack sufficient "real-time" feedback, and unlike human professionals providing services, traditional interactive software systems cannot detect, much less adjust to, a user's emotional state or tailor their interactions with a user depending upon the user's emotional state. Consequently, even though a user may be in a certain emotional state when using the interactive software system or may have certain responses to the interactive software system that change his or her emotional state, traditional interactive software systems are developed in a way that specifically attempts to provide the most useful service to as many of their users as possible, i.e., in a static "one size fits all" approach. Indeed, traditional interactive software systems are, by design, fairly generic in nature and often lack the malleability to meet the specific needs of a given user, much less respond to variations in the emotional state of a given user. As a result, an interactive software system designed for a generic hypothetical user may alienate a specific user, who generally has a temperament that differs from the temperament of the generic hypothetical user and whose emotional state may vary from interaction to interaction.

The inability of traditional interactive software systems to meet the needs of specific users and/or adjust to a user's emotional state often results in user frustration, and ultimately, in lost customers. This is because, predictably, when users feel alienated from, or become frustrated with, an interactive software system, they are far more likely to abandon the interactive software system, which results in lost business.

Because traditional interactive software systems provide a static and generic user experience, they are incapable of adapting the user experience to the user's emotional state. As a result, the user experience and any analysis associated with the user experience is a largely inflexible component of a given version of an interactive software system.

In short, due to a lack of detailed and reliable feedback from users, numerous operations and features of traditional interactive software systems are designed based on generic user models that are, in fact, and by design, not accurately representative of any given "real world" user. It is therefore not surprising that many users, if not all users, of traditional interactive software systems find the experience, at best, impersonal. Specifically, users of traditional tax preparation interactive software systems may find the interview experience unnecessarily frustrating and unpleasant. Clearly, this is not the type of impression that results in happy, loyal, repeat customers.

Even worse, in many cases, the inability of traditional interactive software systems to detect, model, and/or react to a user's emotional state causes users to become frustrated with their user experience, the software system, and the provider of the software system. Many of these users and customers then simply abandon the process and interactive software system completely and may, therefore, never become paying or repeat customers. Furthermore, given the speed and reach of modern communications, any complaints voiced by a dissatisfied user may reach a myriad of other, potential users. Indeed, due to modern communications systems, the number of people that can become the audience for a single complaint is overwhelming and the potential reach of complaints can create serious consequences.

Consequently, lack of detailed, objective, connected, and reliable feedback from users, and resulting inaccurate user modeling, is a long standing technical problem in the interactive software system field. What is needed is a technical solution that provides for obtaining more detailed, connected, and reliable feedback data from users of an interactive software system that has a more empirical and objective basis. Then this feedback data could be used to create predictive models that allow for targeted product diagnosis, targeted interventions, targeted marketing/upsell attempts, and grouping and analysis of feedback and user categories and feedback sources.

SUMMARY

According to embodiments of the present disclosure, biometric data is collected to obtain more detailed, connected, and reliable feedback data from users of an interactive software system that has a more empirical and objective basis.

In various embodiments, the biometric data is then used to create emotional pattern predictive model data representing emotional pattern predictive models associated with users of the interactive software system. In one embodiment, the individual emotional pattern predictive models associated with multiple users of the interactive software system are then analyzed and processed to generate emotional pattern profile data for categories of users. These biometric data based predictive models are then used for targeted product diagnosis, targeted interventions, targeted marketing/upsell attempts, and grouping and analysis of feedback and user categories and feedback sources.

Therefore, embodiments of the present disclosure address some of the long-standing shortcomings associated with traditional interactive software systems by monitoring a user's emotional state using obtained biometric data. In one embodiment, the obtained biometric data is analyzed and used to dynamically modify the user's experience by selecting and/or modifying one or more user experience components and/or features based on the analysis of the user's biometric data. In this way, different categories of user experience components can be utilized, and/or combined, by a single interactive software system, or multiple interactive software systems, to provide the user with an individualized user experience that is adapted to the user's current emotional state.

In addition, embodiments of the disclosure use the biometric data associated with a user to detect that the user is in, or is entering, an undesirable emotional state. For example, in one embodiment, biometric data is used to detect whether the user is becoming frustrated or stressed. Then, in one embodiment, different categories of user experience components can be utilized, and/or re-combined, to adjust the user experience to adapt to the user's new emotional state, prevent the user from entering an undesirable emotional state, and/or encourage the user to enter into a desirable emotional state. In this way, the disclosed embodiments can be used to prevent the user from becoming frustrated with the interactive software system and potentially abandoning the interactive software system.

In accordance with one embodiment, an interactive software system is provided for use by one or more users. In one embodiment, biometric data to be obtained and analyzed is defined and one or more biometric data collection systems are provided to users of the interactive software system to obtain the defined biometric data. In one embodiment, a user's interaction with the interactive software system is monitored and user interaction activity data is obtained indicating the user's interaction with the interactive software system at defined times.

In one embodiment, biometric data associated with the user is obtained using the one or more biometric data collection systems. In one embodiment, the biometric data associated with the user is obtained at defined times as the user interacts with the interactive software system such as, but not limited to: at specific locations and/or interactions with the interactive software system; at defined time intervals; and/or continuously as the user interacts with the interactive software system. In one embodiment, the biometric data associated with the user is correlated with the user's interaction activity data at the defined times. In one embodiment, baseline data, such as, but not limited to, manual feedback data, is obtained from the user as the user interacts with the interactive software system, the baseline data including data indicating when the baseline data was obtained. In one embodiment, the manual feedback data is correlated with the biometric data associated with the user and/or the user's interaction activity data at the defined times.

In one embodiment, the biometric data associated with the user and correlated to the user's interaction activity data and the manual feedback data from the user is analyzed to generate emotional pattern predictive model data representing an emotional pattern predictive model associated with the user.

In one embodiment, based, at least in part, on the emotional pattern predictive model associated with the user, one or more features and/or supporting systems associated with the interactive software system are modified to customize an interactive software system user experience to the user. In one embodiment, the customized interactive software system user experience is then provided to the user.

In one embodiment, emotional pattern predictive model data representing emotional pattern predictive models associated with multiple users is obtained. In one embodiment, the emotional pattern predictive model data representing emotional pattern predictive models associated with multiple users is analyzed to identify one or more user categories. In one embodiment, once one or more user categories are identified, for each user category identified, the emotional pattern predictive model data associated with each of the users of that identified user category is aggregated and analyzed to generate user category emotional pattern profile data for that user category.

In one embodiment, once user category emotional pattern profile data for each user category is generated, a current user begins interacting with the interactive software system.

In one embodiment, using one or more on-line and/or off-line sources of data, a determination is made that the current user of the interactive software system is a user of one of the identified user categories. In one embodiment, the identified user category determined to be that of the current user is then associated with the current user.

In one embodiment, the current user's interaction with the interactive software system is monitored and current user interaction activity data is obtained indicating the current user's interaction with the interactive software system at defined times. In one embodiment, the one or more biometric data collection systems are used to obtain biometric data associated with the current user at defined times as the current user interacts with the interactive software system. In one embodiment, the biometric data associated with the current user is correlated with the current user's interaction activity data.

In one embodiment, the biometric data associated with the current user correlated to the current user's interaction activity data is compared with the user category emotional pattern profile data for the user category associated with the current user. In one embodiment, if a deviation is found between the biometric data associated with the current user correlated to the current user's interaction activity data and the user category emotional pattern profile data for the user category associated with the current user, one or more features and/or supporting systems associated with the interactive software system are modified to customize an interactive software system user experience to the current user. In one embodiment, the customized interactive software system user experience is then presented to the current user.

The disclosed method and system for building and utilizing interactive software system predictive models using biometric data provides a technical solution for obtaining more detailed, connected, and reliable feedback data from users of an interactive software system that has a more empirical and objective basis. This feedback data is then used to create predictive models that allow for targeted product diagnosis, targeted interventions, targeted marketing/upsell attempts, and grouping and analysis of feedback and user categories and feedback sources. Consequently, the disclosed method and system for building and utilizing interactive software system predictive models using biometric data provides a technical solution to the long standing technical problem in the interactive software system field of a lack of detailed, objective, connected, and reliable feedback from users.

The disclosed method and system for building and utilizing interactive software system predictive models using biometric data does not encompass, embody, or preclude other forms of innovation in the area of interactive software system feedback, product analysis, and customer support. In addition, the disclosed method and system for building and utilizing interactive software system predictive models using biometric data is not related to any fundamental economic practice, fundamental data processing practice, mental steps, or pen and paper based solutions, and is, in fact, directed to providing solutions to the relatively new problems associated with obtaining accurate feedback regarding an individual user's experience with an interactive software system. Consequently, the disclosed method and system for building and utilizing interactive software system predictive models using biometric data is not directed to, does not encompass, and is not merely, an abstract idea or concept.

In addition, the disclosed method and system for building and utilizing interactive software system predictive models using biometric data provides for significant improvements to the technical fields of interactive software system analysis, information dissemination, data processing, data management, and user experience.

In addition, by customizing the user experience based on the biometric data and analysis described herein, the user experience associated with the interactive software system can be improved and customized to a selected user's emotional state at the time the user is interacting with the interactive software system. According to one embodiment, by improving the user experience using the biometric data, the interactive software system user experience is personal to the user and dynamically adapted to the user's current emotional state. Thus, using the disclosed method and system for building and utilizing interactive software system predictive models using biometric data results in more efficient use of resources by reducing the number of instances where data is entered by a user and processed by the interactive system only for the user to abandon the interactive software system. Consequently, using the disclosed method and system for building and utilizing interactive software system predictive models using biometric data results in the use of fewer processing cycles, reduced and more efficient use of memory, and reduced use of communications bandwidth to relay data. As a result computing systems and networks implementing the disclosed method and system for building and utilizing interactive software system predictive models using biometric data are faster, more efficient, and more effective.

According to one embodiment, after the user experience is individualized and as a user is interacting with the interactive software system, the biometric data associated with that user is monitored and/or obtained on a periodic or ongoing basis using one or more processes, systems, mechanisms, and/or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed. In one embodiment, as the biometric data associated with the user changes, the user experience is re-adapted to the users changing emotional state by recombining the user experience components dynamically, and in relative real-time.

Therefore, the various embodiments of the disclosure, and their associated benefits, as discussed herein, improve the technical fields of interactive software systems and data processing by using biometric data to dynamically individualize the user experience provided through the interactive software system in an evolving, dynamic, manner that is not only customized to an individual user, but also to the varying emotional states of a specific individual user. Consequently, the disclosed embodiments amount to significantly more than an implementation of the abstract idea of customizing a user experience to a specific user.

Figure 1:
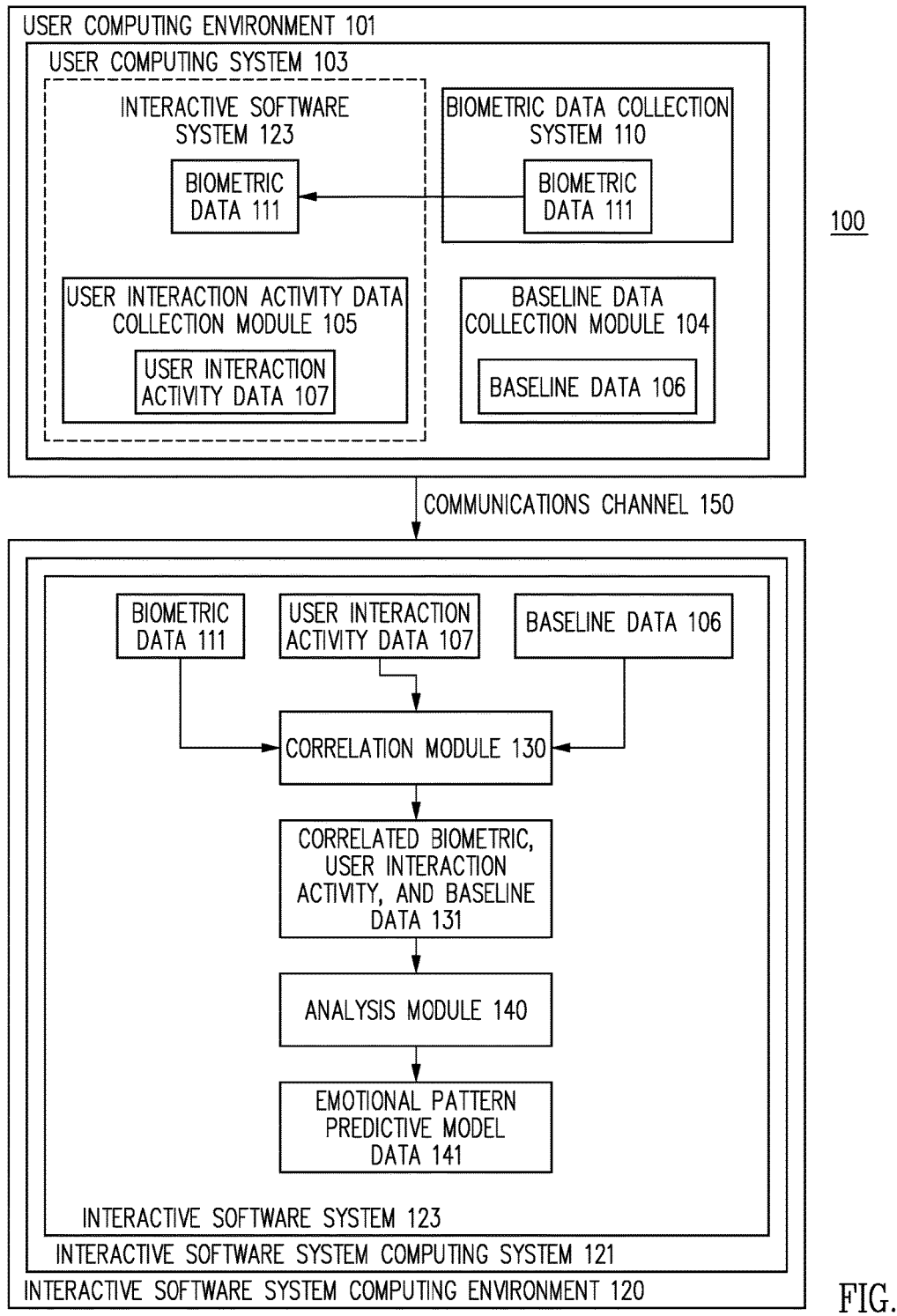
FIG. 1 is a block diagram of software architecture for building interactive software system predictive models using biometric data, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, the term "interactive software system" can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data from one or more sources, provides data to one or more sources, and/or has the capability to analyze at least part of the data.

The term "interactive software system" includes, but is not limited to, any software system that provides an interactive user experience to its users and is implemented on a computing system, accessed through one or more servers, accessed through a network, accessed through a cloud, and/or provided through any computing system or by any means as discussed herein, as known in the art at the time of filing, and/or as developed after the time of filing.

As used herein, the term "interactive software system" includes, but is not limited to, the following: web-based, on-line, and/or computing system implemented personal and/or business tax preparation systems, services, packages, programs, modules, or applications; web-based, on-line, and/or computing system implemented personal and/or business financial management systems, services, packages, programs, modules, or applications; web-based, on-line, and/or computing system implemented personal and/or business management systems, services, packages, programs, modules, or applications; web-based, on-line, and/or computing system implemented personal and/or business accounting and/or invoicing systems, services, packages, programs, modules, or applications; and various other personal and/or business electronic data management systems, services, packages, programs, modules, or applications, whether known at the time of filling or as developed later.

Specific examples of interactive software systems include, but are not limited to the following: TurboTax™ available from Intuit, Inc. of Mountain View, Calif.; TurboTax On-Line™ available from Intuit, Inc. of Mountain View, Calif.; Quicken™, available from Intuit, Inc. of Mountain View, Calif.; Quicken On-Line™, available from Intuit, Inc. of Mountain View, Calif.; QuickBooks™, available from Intuit, Inc. of Mountain View, Calif.; QuickBooks On-Line™, available from Intuit, Inc. of Mountain View, Calif.; Mint™, available from Intuit, Inc. of Mountain View, Calif.; Mint On-Line™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system," "computing device," and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; or any other movable/mobile device and/or computing system that includes components that can execute all, or part, of any one of the processes and/or operations as described herein.

Herein, the terms "mobile computing system" and "mobile device" specifically include devices worn or carried by a user such as, but not limited to, smart watches, wearable Personal Digital Assistants (PDAs); wearable media players; wearable Internet appliances; wearable phones; and/or any other computing system that can be worn by a user and that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network categories; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network categories; or any other system capable of allowing communication between two or more assets, virtual assets, and/or computing systems, whether available or known at the time of filing or as later developed.

Herein, the term "emotional state" refers to an emotional state of a user and includes, but is not limited to, a happy emotional state or happiness; a sad emotional state or sadness; a surprised emotional state or surprise; a fearful emotional state or fear; a disgusted emotional state or disgust; an angry emotional state or anger; a tense emotional state; a nervous emotional state; a stressed emotional state; an upset emotional state; a frustrated emotional state; a depressed emotional state; a bored emotional state; a fatigued emotional state; an alert emotional state; an excited emotional state; an elated emotional state; a contented emotional state; a serene emotional state; a relaxed emotional state; and/or a calm emotional state.

As used herein, the term "biometric data" refers to a quantitative representation of a predicted emotional state and/or combination of emotional states and/or physiological, behavioral, and/or experiential indications of an emotional state and/or a combination of emotional states.

As used herein, the term "emotional state threshold parameter" refers to specific values and/or ranges of values associated with a particular emotional state or combination of emotional states.

Herein, the term "user experience" includes the practical, experiential, affective, significant, and/or valuable aspects of human-software interaction including, but not limited to, data entry, question submission, and/or interview process. As used herein, the term "user experience" includes not only the data entry, question submission, and/or interview process, but also other user experience components provided or displayed to the user such as, but not limited to, the following: individualized user interview questions and question sequences, user interfaces, interface displays, sub-displays, images, side bar displays, pop-up displays, alarms, music, backgrounds, avatars, highlighting mechanisms, icons, assistance resources, user recommendations, supplemental actions and recommendations, and/or any other components that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for building and utilizing interactive software system predictive models using biometric data described herein, and/or a person and/or entity that interfaces with, and/or to whom information is provided by, the method and system for building and utilizing interactive software system predictive models using biometric data described herein, and/or a legal guardian of person and/or entity that interfaces with, and/or to whom information is provided by, the method and system for building and utilizing interactive software system predictive models using biometric data described herein, and/or an authorized agent of any party and/or person and/or entity that interfaces with, and/or to whom information is provided by, the method and system for building and utilizing interactive software system predictive models using biometric data described herein. For instance, in various embodiments, a user can be, but is not limited to, a person, a commercial entity, an application, a service, and/or a computing system.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Instead, these exemplary embodiments are provided to allow a complete disclosure that conveys the principles of the invention, as set forth in the claims, to those of skill in the art.

According to embodiments of the present disclosure, biometric data is collected to obtain more detailed, connected, and reliable feedback data from users of an interactive software system on a more empirical and objective basis.

In various embodiments, the biometric data is then used to create emotional pattern predictive model data representing emotional pattern predictive models associated with users of the interactive software system. In one embodiment, the individual emotional pattern predictive models associated with multiple users of the interactive software system are then analyzed and processed to generate emotional pattern profile data for categories of users. These biometric data based predictive models are then used for targeted product diagnosis, targeted interventions, targeted marketing/upsell attempts, and grouping and analysis of feedback and user categories and feedback sources.

In addition, embodiments of the present disclosure address some of the long-standing shortcomings associated with traditional interactive software systems by monitoring a user's emotional state using obtained biometric data. In one embodiment, the obtained biometric data is analyzed and used to dynamically modify the user's experience by selecting and/or modifying one or more user experience components and/or features based on the analysis of the user's biometric data. In this way, different categories of user experience components can be utilized, and/or combined, by a single interactive software system, or multiple interactive software systems, to provide the user with an individualized user experience that is adapted to the user's current emotional state.

In addition, embodiments of the disclosure use the biometric data associated with a user to detect that the user is in, or is entering, an undesirable emotional state. For example, in one embodiment, biometric data is used to detect whether the user is becoming frustrated or stressed. Then, in one embodiment, different categories of user experience components can be utilized, and/or re-combined, to adjust the user experience to adapt to the user's new emotional state, prevent the user from entering an undesirable emotional state, and/or encourage the user to enter into a desirable emotional state. In this way, the disclosed embodiments can be used to prevent the user from becoming frustrated with the interactive software system and potentially abandoning the interactive software system.

In accordance with one embodiment, an interactive software system is provided for use by one or more users. In various embodiments, the interactive software system provided is any interactive software system as discussed herein, and/or as known in the art at the time of filing, and/or as developed after the time of filing.

As specific illustrative examples, in one embodiment, the interactive software system provided is any interactive software system including, but not limited to, a computing system implemented tax preparation software system; a network accessed tax preparation software system; a web-based tax preparation software system; a cloud-based tax preparation software system; a computing system implemented business management software system; a network accessed business management software system; a web-based business management software system; a cloud-based business management software system; a computing system implemented accounting software system; a network accessed accounting software system; a web-based accounting software system; a cloud-based accounting software system; a computing system implemented financial management system; a network accessed financial management system; a web-based financial management system; and/or a cloud-based financial management system.

In one embodiment, biometric data to be obtained and analyzed is defined. As noted above, herein, the term "biometric data" refers to a quantitative representation of a predicted emotional state and/or combination of emotional states and/or physiological, behavioral, and/or experiential indications of an emotional state and/or a combination of emotional states.

In various embodiments, the biometric data to be obtained and analyzed includes, but is not limited to: data associated with the user's pulse; data indicating the user's heart rate; data indicating the user's blood pressure; data indicating the user's facial expression; data indicating whether the user's eyebrows are raised; data indicating the shape of the user's eyebrows; data indicating whether the skin below the user's brow is stretched; data indicating the presence of wrinkles on the user's forehead; data indicating the location of wrinkles on the user's forehead; data acquired from measuring a user's eye rotation; data indicating the extent to which the user's eyelids are opened; data indicating the extent to which the user's upper eyelid is opened; data indicating the extent to which the user's lower eyelid is opened; data indicating whether lines show below the user's lower eyelid; data indicating the amount of the white of the user's eye showing; data indicating the extent to which the user's jaw is open; data indicating whether the user's teeth are parted; data indicating whether the user's mouth is parted; data indicating whether the user's upper lip is raised; data indicating whether the user's lower lip is raised; data indicating the shape of the user's mouth; data indicating whether the user's nose is wrinkled; data indicating whether the user's nostrils are dilated; data indicating whether the user's cheeks are raised; data indicating whether the user's lower jaw juts out; data indicating the user's voice; data indicating the volume and frequency of the user's voice; data indicating the speed with which the user is speaking; data indicating the cadence with which the user is speaking; data indicating the user's body temperature; data indicating whether the user is perspiring; data indicating the amount of perspiration present on the user's skin; data indicating the force with which the user touches hardware associated with the interactive software system; data indicating the speed with which the user touches hardware associated with the interactive software system; data acquired from measuring a user's oxygen saturation; data acquired from measuring a user's blood pressure; data acquired from measuring a user's muscle tension; data acquired from measuring a user's neural activity; data acquired from measuring a user's eye blinking rate; data associated with the user's own characterization of his or her emotional state; historical user data; data associated with a segment of users having characteristics comparable to the user; and/or various other biometric data similar to the specific illustrative examples discussed herein, and/or known in the art at the time of filing, and/or as developed after the time of filing.

In some embodiments, the biometric data is to be used as an indicator of a user's emotional state. To this end, in some embodiments, emotional state threshold parameter data is defined that provides a means of analyzing that biometric data. In various embodiments, the defined emotional states, with associated emotional state threshold parameter data, include but are not limited to: a happy emotional state or happiness; a sad emotional state or sadness; a surprised emotional state or surprise; a fearful emotional state or fear; a disgusted emotional state or disgust; an angry emotional state or anger; a tense emotional state; a nervous emotional state; a stressed emotional state; an upset emotional state; a frustrated emotional state; a depressed emotional state; a bored emotional state; a fatigued emotional state; an alert emotional state; an excited emotional state; an elated emotional state; a happy emotional state; a contented emotional state; a serene emotional state; a relaxed emotional state; a calm emotional state; and/or any other emotional state as discussed herein, and/or as known in the art at the time of filing, and/or as developed after the time of filing.

In one embodiment, emotional state threshold parameter data associated with each category of biometric data is identified and defined. In one embodiment, specific emotional state threshold parameter data is defined for each category of biometric data to establish whether a user has reached, or is approaching, an associated emotional state. For example, a defined emotional state threshold parameter may provide that when a user's heart is beating at a rate greater than 100 beats per minute, the user is in, or is approaching, a stressed emotional state.

In one embodiment, the emotional state threshold parameter data associated with one or more of the one or more categories of biometric data is identified and defined based on biometric data obtained from a group of people, and/or norms obtained from various medical data processors and medical institutions. In one embodiment, the emotional state threshold parameter data associated with one or more of the one or more categories of biometric data is identified and defined based on biometric data obtained from the specific user, i.e. the emotional state threshold parameter data is customized to the specific, current user. In some of these embodiments, the emotional state threshold parameter data associated with one of the one or more categories of biometric data from a group of people and/or norms obtained from various medical data processors and medical institutions is initially used as base data and then a customized emotional profile for the specific user is developed based on feedback from the specific user and emotional data monitoring of the specific user.

As noted above, in one embodiment, one type of biometric data defined is the rate of a user's heart beat to provide data about the user's emotional state. For example, in one embodiment, a heart rate emotional state threshold parameter associated with a user's heart beat is defined. In one embodiment, the emotional state threshold parameter may be defined to provide that a user with a heartbeat of over 100 beats per minute is stressed.

In one embodiment, the defined biometric data includes heart rate variability data and a heart rate variability level emotional state threshold parameter associated with a user's heart beat is defined.

In one embodiment, the defined biometric data includes scan path data associated with the user's eye rotation and a scan path emotional state threshold parameter associated with a user's eye rotation is defined. In one embodiment, a fixation period emotional state threshold parameter associated with a user's eye rotation is defined such that if the fixation period emotional state threshold parameter is exceeded and/or is not met, then the user is determined to be in one or more of the defined emotional states.

In one embodiment, the defined biometric data includes skin conductance data and a skin conductance level emotional state threshold parameter associated with a user's perspiration is defined such that if the skin conductance level emotional state threshold parameter is exceeded and/or is not met, then the user is determined to be in one or more of the defined emotional states.

In one embodiment, the defined biometric data includes respiration rate data and a respiration rate emotional state threshold parameter associated with a user's respiration is defined such that if the respiration rate emotional state threshold parameter is exceeded and/or is not met, then the user is determined to be in one or more of the defined emotional states.

In one embodiment, the defined biometric data includes oxygen saturation level data and an oxygen saturation level emotional state threshold parameter associated with a user's oxygen saturation is defined such that if the oxygen saturation level emotional state threshold parameter is exceeded and/or is not met, then the user is determined to be in one or more of the defined emotional states.

In one embodiment, the defined biometric data includes blood pressure level data and a blood pressure level emotional state threshold parameter associated with a user's blood pressure is defined such that if the blood pressure level emotional state threshold parameter is exceeded and/or is not met, then the user is determined to be in one or more of the defined emotional states.

In one embodiment, the defined biometric data includes skin temperature data and a skin temperature emotional state threshold parameter associated with a user's skin temperature is defined such that if the skin temperature emotional state threshold parameter is exceeded and/or is not met, then the user is determined to be in one or more of the defined emotional states.

In one embodiment, the defined biometric data includes muscle tension level data and a muscle tension level emotional state threshold parameter associated with a user's muscle tension is defined such that if the muscle tension level emotional state threshold parameter is exceeded and/or is not met, then the user is determined to be in one or more of the defined emotional states.

In one embodiment, defined biometric data includes neural activity level data and a neural activity level emotional state threshold parameter associated with a user's neural activity is defined such that if the neural activity level emotional state threshold parameter is exceeded and/or is not met, then the user is determined to be in one or more of the defined emotional states.

In one embodiment, the defined biometric data includes eye blink rate data and an eye blink rate emotional state threshold parameter associated with a user's eye blinking is defined such that if the eye blink rate emotional state threshold parameter is exceeded and/or is not met, then the user is determined to be in one or more of the defined emotional states.

In one embodiment, the defined biometric data includes facial muscle movement data and a facial muscle movement emotional state threshold parameter associated with a user's facial expression is defined such that if the facial muscle movement emotional state threshold parameter is exceeded and/or is not met, then the user is determined to be in one or more of the defined emotional states.

In one embodiment, the defined biometric data includes acoustic data and an acoustic characteristics emotional state threshold parameter associated with a user's voice and/or speech is defined such that if the acoustic characteristics emotional state threshold parameter is exceeded and/or is not met, then the user is determined to be in one or more of the defined emotional states.

In one embodiment, the defined biometric data includes contact pressure data and a contact pressure emotional state threshold parameter associated with a user's interaction with hardware associated with the interactive software system is defined such that if the contact pressure emotional state threshold parameter is exceeded and/or is not met, then the user is determined to be in one or more of the defined emotional states.

In one embodiment, the defined biometric data includes contact rate data and a contact rate emotional state threshold parameter associated with a user's interaction with hardware associated with the interactive software system is defined such that if the contact rate emotional state threshold parameter associated is exceeded and/or is not met, then the user is determined to be in one or more of the defined emotional states.

As discussed below, one or more of the embodiments disclosed herein utilize and/or incorporate theories and relationships discovered through analysis of data obtained from a user, multiple users, and/or general study of human emotion. Consequently, the emotional state threshold parameter data represents an ordering of biometric data. In one embodiment, emotional state threshold parameter data is defined for one category of biometric data. In one embodiment, emotional state threshold parameter data are defined for a combination of categories of biometric data.

In various embodiments, the defined biometric data, and any associated emotional state threshold parameters, are defined such as, but not limited to, any discussed herein, and/or as known in the art at the time of filing, and/or as developed after the time of filing.

In one embodiment, one or more biometric data collection systems are provided to users of the interactive software system to obtain the defined biometric data.

In various embodiments, the one or more biometric data collection systems include, but are not limited to, one or more of the following: a heart rate monitor associated with an interactive software system, an eye tracker associated with an interactive software system; a biometric data collection system associated with an interactive software system to measure a user's skin conductance level; a biometric data collection system associated with an interactive software system to measure a user's respiration rate; a biometric data collection system associated with an interactive software system to measure a user's oxygen saturation level; a biometric data collection system associated with an interactive software system to measure a user's blood pressure level; a biometric data collection system associated with an interactive software system to measure a user's skin temperature; a biometric data collection system associated with an interactive software system to measure a user's muscle tension level; a biometric data collection system associated with an interactive software system to measure a user's neural activity; a biometric data collection system associated with an interactive software system to measure a user's eye blink rate; a biometric data collection system associated with an interactive software system to measure a user's facial muscle movement; a biometric data collection system associated with an interactive software system to measure a user's acoustic characteristics; a biometric data collection system associated with an interactive software system to measure a user's interaction with hardware associated with an interactive software system; and/or any biometric data collection system as discussed herein, and/or as known in the art at the time of filing, and/or as developed after the time of filing.

In one embodiment, the biometric data includes the user's pulse and is obtained using a heart rate monitor operatively coupled to, and/or otherwise associated with, a computing system used to implement at least part of the interactive software system. In one embodiment, the biometric data includes the user's blood pressure and is obtained using a blood pressure monitor operatively coupled to, and/or otherwise associated with, a computing system used to implement at least part of the interactive software system. In one embodiment, the biometric data includes the user's facial expression and is obtained using facial expression recognition software and/or hardware operatively coupled to, and/or otherwise associated with, a computing system used to implement at least part of the interactive software system. In one embodiment, the biometric data includes the user's voice and is obtained using speech recognition software operatively coupled to, and/or otherwise associated with, a computing system used to implement at least part of the interactive software system. In one embodiment, the biometric data includes the user's body temperature and is obtained using a temperature sensor operatively coupled to, and/or otherwise associated with, a computing system used to implement at least part of the interactive software system.

In one embodiment, the biometric data includes data measuring the user's perspiration and is obtained using a perspiration sensor operatively coupled to, and/or otherwise associated with, a computing system used to implement at least part of the interactive software system. In one embodiment, the biometric data includes the force with which the user interacts with hardware associated with the interactive software system and is obtained using a pressure sensor associated with a keyboard, and/or mouse, touch screen, and/or other user interface system operatively coupled to, and/or otherwise associated with, a computing system used to implement at least part of the interactive software system. In one embodiment, the biometric data includes the speed with which the user interacts with hardware associated with the interactive software system and is obtained using a sensor associated with a keyboard and/or mouse, touch screen, and/or other user interface system operatively coupled to, and/or otherwise associated with, a computing system used to implement at least part of the interactive software system.

Numerous means, methods, systems, algorithms, procedures, and processes are known in the art for detecting emotional states, and/or obtaining biometric data associated with a user. Consequently, a more detailed discussion of any particular means, method, system, algorithm, procedure, and process for detecting emotional states, and/or obtaining biometric data, associated with a user is omitted here to avoid detracting from the invention.

In one embodiment, a user's interaction with the interactive software system is monitored and user interaction activity data is obtained indicating the user's interaction with the interactive software system at defined times.

In various embodiments, as a user proceeds to interact with the interactive software system, the user's interactions are monitored and user interaction activity data is obtained indicating what portion of the interactive software system the user was interacting with at a defined time and/or what type of interaction was taking place at a defined time.

In some embodiments, the user interaction activity data is obtained only at specific times and/or when it is determined that the user is interacting with a specific module, screenshot, data entry field, or other portion of the interactive software system. In some embodiments, the user interaction activity data is obtained at specific modules, screenshots, data entry fields, or other portions of the software system where it is predicted the user may experience a change in emotional state and/or need some form of intervention and/or customer assistance.

In other embodiments, the user interaction activity data is obtained continuously so long as a user is interacting with the interactive software system and the user interaction activity data includes timestamp data and/or location data indicating what portion of the interactive software system the user was interacting with at a given time.

In one embodiment, biometric data associated with the user is obtained using the one or more biometric data collection systems.

According to one embodiment, as a user is interacting with the interactive software system, the biometric data associated with the user is monitored and/or obtained using one or more processes, systems, mechanisms or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed and/or compared to the emotional state threshold parameter data associated with the category of biometric data received.

Similar to the collection of user interaction activity data, in some embodiments, the user biometric data is obtained only at specific times and/or when it is determined that the user is interacting with a specific module, screenshot, data entry field, or other portion of the interactive software system. In some embodiments, the user biometric data is obtained at specific modules, screenshots, data entry fields, or other portions of the software system where it is predicted the user may experience a change in emotional state and/or need some form of intervention and/or customer assistance.

In other embodiments, the user biometric data is obtained continuously so long as a user is interacting with the interactive software system and the user biometric data includes timestamp data and/or location data indicating what portion of the interactive software system the user was interacting with at a given time.

In one embodiment, the biometric data associated with the user is correlated with the user's interaction activity data at the defined times. In one embodiment, the user biometric data and the user interaction activity data is correlated at the defined times discussed above so that a direct mapping between the user biometric data and the user's location and/or activity within the interactive software system is obtained. In this way, detailed feedback is obtained indicating the user's specific biometric data, and associated emotional state, when the user is interacting with the interactive software system, and a specific module, screenshot, data entry field provided through the interactive software system. Consequently, the feedback obtained is more granular, specific, and accurate than is possible using prior art methods of collecting user feedback.

In various embodiments, the correlated user biometric data and user interaction activity data provides more detailed and focused feedback than can be obtained using traditional feedback mechanisms. Consequently, in one embodiment this feedback data can be used by product development and customer care teams to identify operations and/or features of the interactive software system that should be analyzed for improvement, and/or operations and/or features that are particularly effective. In addition, the correlated user biometric data and user interaction activity data can also be used to more accurately predict where the user, and users like the user, might benefit from various forms of intervention and/or offers of customer support. Unlike the prior art, these predicted interventions, and when the interventions take place, are selected based on real biometric feedback of a very focused and detailed nature.

In one embodiment, baseline data, such as, but not limited to, manual feedback data, is obtained from the user as the user interacts with the interactive software system, the baseline data including data indicating when the baseline data was obtained. In one embodiment, the manual feedback data is correlated with the biometric data associated with the user and/or the user's interaction activity data at the defined times.

In various embodiments, the manual feedback data consists of data representing the user's responses to questions regarding the user's current emotional state and/or data associated with the user's own characterization of his or her emotional state. For instance the user may simply respond to a question like "Are you currently excited, angry, or confused?" The response data is then used to create reference sets and train the predictive models being used and/or created. For instance, and elevated heart rate could indicate, an angry state or an elated state. By obtaining manual feedback, data is obtained indicating which one is the current case. Consequently, in one embodiment, the manual feedback data represents the user's own characterization of his or her emotional state at specific times, and/or at defined locations within the interactive software system. In this way, pseudo-survey type data is collected in real time that is correlated to the specific activity the user is engaged in when the data is collected. This provides more accurate and focused feedback than is available using traditional survey type feedback.

In one embodiment, the biometric data associated with the user and correlated to the user's interaction activity data and the manual feedback data from the user is analyzed to generate emotional pattern predictive model data representing an emotional pattern predictive model associated with the user.

In one embodiment, by correlating collected user biometric data, the user's interaction activity data, and manual feedback data received from the user, an emotional pattern predictive model is generated indicating the users emotional state, in extreme detail, objectively, and as correlated from multiple sources, at each of the defined times which, in one embodiment, can include the entire timeframe during which the user was interacting with the interactive software system. Therefore, in one embodiment, data indicating the user response to virtually every interaction with the interactive software system can be obtained, aggregated, and analyzed to generate extremely accurate and detailed emotional pattern predictive model data for the user.

In various embodiments, the emotional pattern predictive model data for the user provides more detailed and focused feedback than can be obtained using traditional feedback mechanisms. Consequently, in one embodiment, the emotional pattern predictive model data for the user can be used by product development and customer care teams to identify operations and/or features of the interactive software system that should be analyzed for improvement, and/or operations and/or features that are particularly effective. In addition, the emotional pattern predictive model data can also be used to more accurately predict where the user, and users like the user, might benefit from various forms of intervention and/or offers of customer support. Unlike the prior art, these predicted interventions, and when the interventions take place, are selected based on real biometric feedback of a very focused and detailed nature.

In one embodiment, based, at least in part, on the emotional pattern predictive model associated with the user, one or more features and/or supporting systems associated with the interactive software system are modified to customize an interactive software system user experience to the user.

In various embodiments, the one or more features and/or supporting systems associated with the interactive software system that can be modified to customize the interactive software system user experience include, but are not limited to: a sequence with which interview questions are presented to the user; content or topics of the interview questions that are presented to the user; font sizes used while presenting information to the user; length of descriptions provided to the user; themes presented to the user; categories of icons displayed to the user; categories of interface formats presented to the user; interface displays presented to the user, images displayed to the user, assistance resources listed and/or recommended to the user, when assistance resources are offered/provided to the user, wording used in the interactive software system; user recommendations presented to the user; backgrounds presented to the user; background audio presented to the user; avatars and/or icons presented to the user; highlighting mechanisms used and highlighted components presented to the user, support mechanisms presented to the user; marketing devices provided to the user; the timing of providing marketing devices to the user; off-line supplemental actions and recommendations provided to the user; ideal intervention, check-in, or touch points for a given user or user category; and/or any other features and/or supporting systems associated with interactive software systems as discussed herein, and/or as known in the art of time of filing, and/or as developed after the time of filing.

In one embodiment, the customized interactive software system user experience is then provided to the user. In one embodiment, the customized interactive software system user experience is provided to the user via a user computing system such as, but not limited to: a server computing system; a workstation; a desktop computing system; a mobile computing system; and/or any other computing system as discussed herein, and/or as known in the art at the time of filing, and/or as developed after the time of filing.

As one specific illustrative example, in one embodiment, one or more user experience components are identified and user experience component data representing the one or more user experience components is generated and stored in one or more partitioned user experience data sections of a memory device and/or system. In one embodiment, user experience components include, but are not limited to, individualized user interview questions and question sequences; user interfaces; interface displays; sub-displays; images; side bar displays; pop-up displays; alarms; music; backgrounds; avatars; highlighting mechanisms; icons; assistance resources; user recommendations; support recommendations; supplemental actions and recommendations; and/or any other components that individually, or in combination, create a user experience, as discussed herein, and/or as known in the art at the time of filing, and/or as developed after the time of filing.

In one embodiment, the biometric data to be obtained and analyzed is identified and defined. In one embodiment, emotional state threshold parameter data associated with each type of biometric data is identified and defined. In one embodiment, specific emotional state threshold parameter data is defined for each type of biometric data to establish whether a user has reached, or is approaching, an associated emotional state. For example, a defined emotional state threshold parameter may provide that when a user's heart is beating at a rate greater than 100 beats per minute, the user is in, or is approaching, a stressed emotional state.

In one embodiment, the emotional state threshold parameter data associated with one or more of the one or more types of biometric data is identified and defined based on biometric data obtained from a group of people, and/or norms obtained from various medical data processors and medical institutions. In one embodiment, the emotional state threshold parameter data associated with one or more of the one or more types of biometric data is identified and defined based on biometric data obtained from the specific user, i.e. the emotional state threshold parameter data is customized to the specific, current user. In some of these embodiments, the emotional state threshold parameter data associated with one of the one or more types of biometric data from a group of people and/or norms obtained from various medical data processors and medical institutions is initially used as base data and then a customized emotional profile for the specific user is developed based on feedback from the specific user and emotional data monitoring of the specific user.

According to one embodiment, as a user is interacting with the interactive software system, the biometric data associated with the user is monitored and/or obtained using one or more processes, systems, mechanisms or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed and/or compared to the emotional state threshold parameter data associated with the type of biometric data received.

In one embodiment, the one or more analytics modules are "pluggable," e.g., interchangeable, analytics modules/components to be used with one or more interactive software systems that can be selected, interfaced with, and interchanged, without requiring the redeployment of either the interactive software system or any individual analytics module. In this way, different types of biometric data can be analyzed and utilized by a single interactive software system or version, or interactive software systems and/or versions, and different analytic algorithms can be interchangeably deployed. As a result, individualized user experiences can be provided that are composed of different user experience components, including, but not limited to, individualized user interview questions and question sequences; user interfaces; interface displays; sub-displays; images; side bar displays; pop-up displays; alarms; music; backgrounds; avatars; highlighting mechanisms; icons; assistance resources; user recommendations; supplemental actions and recommendations; and/or any other components that individually, or in combination, create a user experience, as discussed herein, and/or as known in the art at the time of filing, and/or as developed after the time of filing.

In one embodiment, based on the analysis of the biometric data associated with the user, a current emotional state of the user is determined. In one embodiment, based, at least in part, on the determined current emotional state of the user, the interactive software system adapts to provide an individualized user experience to the user by presenting a set of the user experience components to the user that is customized based on the user's biometric data and the analysis of one or more analytics algorithms provided through the one or more interchangeable analytics modules.

For example, if the user's biometric data shows that the user's heart is beating at a rate of 110 beats per minute and the defined emotional state threshold parameter data provides that when a user's heart is beating at a rate greater than 100 beats per minute the user is in a stressed emotional state, the biometric data and the emotional state threshold parameter data is analyzed by the one or more analytics algorithms provided through the one or more interchangeable analytics modules and a determination is made that the user is in the stressed emotional state. Consequently, in this specific illustrative example, a user experience component or combination of user experience components are selected by one of the one or more analytics modules to create a user experience with a stress-reducing effect.

For example, in one embodiment, if a user is in a stressed emotional state, a user experience component or combination of user experience components may be selected to provide the user with soothing background colors as part of the user experience. In one embodiment, if the user is in a stressed emotional state, a user experience component or combination of user experience components may be selected to provide the user with soft music as part of the user experience. In one embodiment, if a user is in a stressed emotional state, a user experience component or combination of user experience components may be selected to provide the user with additional assistance as part of the user experience.

As noted above, in one embodiment, user experience components are determined by the one or more analytics modules described herein based on biometric data such as, but not limited to, the user's own characterization of his or her emotional state, historical user data, data associated with a segment of users having characteristics comparable to the user; the user's heart rate, the user's blood pressure, the volume of the user's voice, the speed with which the user is speaking, the cadence with which the user is speaking, the user's body temperature, whether the user is perspiring, the amount of perspiration present on the user's skin, the force with which the user interacts with hardware associated with the interactive software system, the speed with which the user interacts with hardware associated with the interactive software system, and/or various other biometric data similar to the specific illustrative user data examples discussed herein.

According to one embodiment, other user experience components such as, but not limited to, individualized user interview questions and question sequences, user interfaces, interface displays, sub-displays, images, side bar displays, pop-up displays, alarms, music, backgrounds, avatars, highlighting mechanisms, icons, assistance resources, user recommendations, supplemental actions and recommendations, and/or any other components that individually, or in combination, create a user experience, as discussed herein, and/or as known in the art at the time of filing, and/or as developed after the time of filing, are adapted, adjusted, ordered, and/or otherwise customized to the current user, based on the user's current emotional state as determined by relatively real-time analysis of the user's biometric data by the one or more of the interchangeable analytics modules described herein.

In one embodiment, by customizing the user experience based on the biometric data and analysis described herein, the user experience associated with the interactive software system can be improved and customized to a selected user's emotional state at the time the user is interacting with the interactive software system. According to one embodiment, by improving the user experience using the biometric data, the interactive software system user experience is personal to the user and dynamically adapted to the user's current emotional state. Thus, using the disclosed method and system for using biometric data to tailor the user experience of an interactive software system results in more efficient use of resources by reducing the number of instances where data is entered by a user and processed by the interactive system only for the user to abandon the interactive software system. Consequently, using the disclosed method and system for using biometric data to tailor the user experience of an interactive software system results in the use of fewer processing cycles, reduced and more efficient use of memory, and reduced use of communications bandwidth to relay data. As a result computing systems and networks implementing the disclosed method and system for using biometric data to tailor the user experience of an interactive software system are faster, more efficient, and more effective.

According to one embodiment, after the user experience is individualized and as a user is interacting with the interactive software system, the biometric data associated with that user is monitored and/or obtained on a periodic or ongoing basis using one or more processes, systems, mechanisms, and/or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed and/or compared to the emotional state threshold parameter data associated with the type of biometric data received. In one embodiment, as the biometric data associated with the user changes, the user experience is re-adapted to the users changing emotional state by recombining the user experience components dynamically, and in relative real-time.

As noted above, in one embodiment, individualizing the user experience within the interactive software system is accomplished, at least in part, by providing the biometric data associated with a selected user to one or more of the selected interchangeable analytics modules described herein. In one embodiment, the selected interchangeable analytics modules then process the user data according to the specific one or more analytics algorithms included in the selected interchangeable analytics modules to generate, specify, and/or determine which user experience components are to be provided to the user. According to one embodiment, instead of modifying the entire interactive software system, improvements to analytics algorithms for individualizing user experience components may be updated simply by replacing or overwriting a prior version of the selected one or more interchangeable analytics modules with an updated version of the selected one or more interchangeable analytics modules, potentially saving significant time and development costs, by providing a "plug and play," real-time/minimal down time modification capability.

Therefore, the various embodiments of the disclosure, and their associated benefits, as discussed herein, improve the technical fields of interactive software systems and data processing by using biometric data to dynamically individualize the user experience provided through the interactive software system in an evolving, dynamic, manner that is not only customized to an individual user, but also to the varying emotional states of a specific individual user. Consequently, the disclosed embodiments amount to significantly more than an implementation of the abstract idea of customizing a user experience to a specific user.

In one embodiment, emotional pattern predictive model data representing emotional pattern predictive models associated with multiple users is obtained. In various embodiments, the emotional pattern predictive model data for two or more users is generated using one or more embodiments of the process discussed above.

In one embodiment, the emotional pattern predictive model data representing emotional pattern predictive models associated with multiple users is analyzed to identify one or more user categories. In various embodiments, the one or more user categories can be defined based on any common parameters desired. For instance, one or more user categories can include generalized user categories such as, but not limited to: a type "A" personality user category; a relaxed personality user category; a detailed oriented user category; a mobile or on the go user category; and/or any other generalized user category as discussed herein, and/or as known in the art at the time of filing, and/or as developed after the time of filing.

In addition, one or more user categories can include more specifically focused user categories associated with a specific type of interactive software system, such as a tax preparation software application with specific illustrative examples such as, but not limited to: a tax adverse or tax anxious user category; a tax neutral user category; a complexity adverse user category; a simplicity adverse user category; and/or any other specifically focused user category as discussed herein, and/or as known in the art at the time of filing and/or as developed after the time of filing.

In one embodiment, once one or more user categories are identified, for each user category identified, the emotional pattern predictive model data associated with each of the users of that identified user category is aggregated and analyzed to generate user category emotional pattern profile data for that user category.

In one embodiment, the user category emotional pattern profile data for each user category is collected by aggregating the individual emotional pattern profile data for each user determined to be a member of the user category. In one embodiment, the user category emotional pattern profile data is then analyzed to identify specific traits, parameters, and biometric data common to most, many, or all, of the individual users determined to be members of the user category.

In one embodiment, in addition to identifying specific traits, parameters, and correlated biometric data, off-line data, i.e. data not directly related to the user's biometric data, is obtained from the users and common parameters within the off-line data identified. Specific examples of off-line data correlated to the user category emotional pattern profile data include, but are not limited to: demographic data associated with the users determined to be members of the user category; geographic data associated with users determined to be members of the user category; economic data, such as income data, associated with users determined to be members of the user category; political affiliation data associated with users determined to be members of the user category; and/or any other off-line data as discussed herein, and/or as known in the art at the time of filing, and/or as developed after the time of filing. In addition, the off-line data can include data representing responses to simple questions presented to the user such as "What personality type are you?" or "How do you feel about the tax preparation process?"

In one embodiment, the off-line data is used to determine at least an initial user category to assign to any new user for which no biometric data has yet been collected, and/or a user who does not have access to biometric data collection systems and therefore cannot provide biometric data. In one embodiment, off-line data associated with the new user is obtained from the user and then used to match the new user to one of the user categories based on the off-line data associated with the user categories.

In one embodiment, once user category emotional pattern profile data for each user category is generated, a current user begins interacting with the interactive software system.

In one embodiment, using one or more on-line and/or off-line sources of data, a determination is made that the current user of the interactive software system is a user of one of the identified user categories. In one embodiment, if a current user has already used the interactive software system, emotional pattern predictive model data associated with the user has already been obtained, and a user category has already been assigned to the user.

In one embodiment, if the current user is a new user, as the user interacts with the interactive software system, biometric data is collected and once enough biometric data is collected, a determination is made regarding which user category is most closely matched to the current user.

In addition, as noted above, in one embodiment, the off-line data is used to determine at least an initial user category to assign to any new user for which no biometric data has yet been collected, and/or a user who does not have access to biometric data collection systems and therefore cannot provide biometric data. In one embodiment, off-line data associated with the new user is obtained from the user and then used to match the new user to one of the user categories based on the off-line data associated with the user categories.

In one embodiment, once a user category is determined to be that of the current user, the identified user category determined to be that of the current user is associated with the current user. Consequently, at least until contradictory data is received, the current user is analyzed in light of the user category emotional pattern profile data associated with the category assigned to the user. It is also therefore assumed that the emotional pattern predictive model data generated as the current user interacts with interactive software system will resemble the user category emotional pattern profile data associated with the category assigned to the user.

In one embodiment, the current user's interaction with the interactive software system is monitored and current user interaction activity data is obtained indicating the current user's interaction with the interactive software system at defined times. A discussion of this process is provided above.

In one embodiment, the one or more biometric data collection systems are used to obtain biometric data associated with the current user at defined times as the current user interacts with the interactive software system. A discussion of this process is provided above.

In one embodiment, the biometric data associated with the current user is correlated with the current user's interaction activity data. Discussion of this process is provided above.

In one embodiment, the biometric data associated with the current user correlated to the current user's interaction activity data is compared with the user category emotional pattern profile data for the user category associated with the current user.

As noted above, in one embodiment, once a user category is determined to be that of the current user, the identified user category determined to be that of the current user is associated with the current user. Consequently, at least until contradictory data is received, the current user is analyzed in light of the user category emotional pattern profile data associated with the category assigned to the user. It is also therefore assumed that the emotional pattern predictive model data generated as the current user interacts with interactive software system will resemble the user category emotional pattern profile data associated with the category assigned to the user.

In one embodiment, if a deviation is found between the biometric data associated with the current user correlated to the current user's interaction activity data and the user category emotional pattern profile data for the user category associated with the current user, one or more features and/or supporting systems associated with the interactive software system are modified to customize an interactive software system user experience to the current user.

A discussion of the one or more features and/or supporting systems associated with the software system that can be modified to customize the interactive software system user experience to the current user is provided above.

In one embodiment, the customized interactive software system user experience is then presented to the current user.

The disclosed method and system for building and utilizing interactive software system predictive models using biometric data provides a technical solution for obtaining more detailed, connected, and reliable feedback data from users of an interactive software system that has a more empirical and objective basis. This feedback data is then used to create predictive models that allow for targeted product diagnosis, targeted interventions, targeted marketing/upsell attempts, and grouping and analysis of feedback and user categories and feedback sources. Consequently, the disclosed method and system for building and utilizing interactive software system predictive models using biometric data provides a technical solution to the long standing technical problem in the interactive software system field of a lack of detailed, objective, connected, and reliable feedback from users.

The disclosed method and system for building and utilizing interactive software system predictive models using biometric data does not encompass, embody, or preclude other forms of innovation in the area of interactive software system feedback, product analysis, and customer support. In addition, the disclosed method and system for building and utilizing interactive software system predictive models using biometric data is not related to any fundamental economic practice, fundamental data processing practice, mental steps, or pen and paper based solutions, and is, in fact, directed to providing solutions to the relatively new problems associated with obtaining accurate feedback regarding an individual user's experience with an interactive software system. Consequently, the disclosed method and system for building and utilizing interactive software system predictive models using biometric data is not directed to, does not encompass, and is not merely, an abstract idea or concept.

In addition, the disclosed method and system for building and utilizing interactive software system predictive models using biometric data provides for significant improvements to the technical fields of interactive software system analysis, information dissemination, data processing, data management, and user experience.

Therefore, the various embodiments of the disclosure, and their associated benefits, as discussed herein, improve the technical fields of interactive software systems and data processing by using biometric data to dynamically individualize the user experience provided through the interactive software system in an evolving, dynamic, manner that is not only customized to an individual user, but also to the varying emotional states of a specific individual user. Consequently, the disclosed embodiments amount to significantly more than an implementation of the abstract idea of customizing a user experience to a specific user.

Hardware Architecture

FIG. 1 is a block diagram of a production environment 100 for building interactive software system predictive models using biometric data in accordance with one embodiment.

As seen in FIG. 1, in this specific illustrative example, production environment 100 includes user computing environment 101 and interactive software system computing environment 120.

In various embodiments, user computing environment 101 and interactive software system computing environment 120 are any computing environments as discussed herein, and/or as known in the art at the time of filing, and/or as developed after the time of filing. In various embodiments, user computing environment 101 and interactive software system computing environment 120 can be combined, or further divided, into fewer, or more, computing environments.

As seen in FIG. 1, in one embodiment, user computing system 103 is provided in user computing environment 101. As seen in FIG. 1, in one embodiment, user computing system 103 includes biometric data collection system 110 and collected biometric data 111 obtained by any of the methods, systems, and/or processes discussed herein. As seen in FIG. 1, in one embodiment, user computing system 103 includes baseline data collection module 104 including baseline data 106 obtained by any of the methods, systems, and/or processes discussed herein.

As also seen in FIG. 1, user computing system 103 includes at least an interface portion of interactive software system 123. In one embodiment, biometric data 111 is provided to interactive software system 123. In addition, in one embodiment, interactive software system 123 includes user interaction activity collection module 105 and collected user interaction activity data 107 obtained by any of the methods, systems, and/or processes discussed herein.

As seen in FIG. 1, interactive software system computing environment 120 includes interactive software system computing system 121 implementing and/or providing interactive software system 123.

As seen in FIG. 1, biometric data 111, user interaction activity data 107 and baseline data 106 are provided to interactive software system 123 via communications channel 150. In one embodiment, biometric data 111, user interaction activity data 107 and baseline data 106 are provided to correlation module 130 where biometric data 111, user interaction activity data 107 and baseline data 106 are correlated temporally or by location/activity to generate correlated biometric, user interaction activity, and baseline data 131 using any of the methods, systems, and/or processes discussed herein.

As seen in FIG. 1, correlated biometric, user interaction activity, and baseline data 131 is provided to analysis module 140 which analyzes correlated biometric, user interaction activity, and baseline data 131 in accordance with any of the methods, systems, and/or processes discussed herein to generate emotional pattern predictive model data 141. Once generated, emotional pattern predictive model data 141 is utilized as described in any of the embodiments discussed herein.

Process

According to embodiments of the present disclosure, biometric data is collected to obtain more detailed, connected, and reliable feedback data from users of an interactive software system that has a more empirical and objective basis.

In various embodiments, the biometric data is then used to create emotional pattern predictive model data representing emotional pattern predictive models associated with users of the interactive software system. In one embodiment, the individual emotional pattern predictive models associated with multiple users of the interactive software system are then analyzed and processed to generate emotional pattern profile data for categories of users. These biometric data based predictive models are then used for targeted product diagnosis, targeted interventions, targeted marketing/upsell attempts, and grouping and analysis of feedback and user categories and feedback sources. Therefore, embodiments of the present disclosure address some of the long-standing shortcomings associated with traditional interactive software systems by monitoring a user's emotional state using obtained biometric data.

Figure 2:
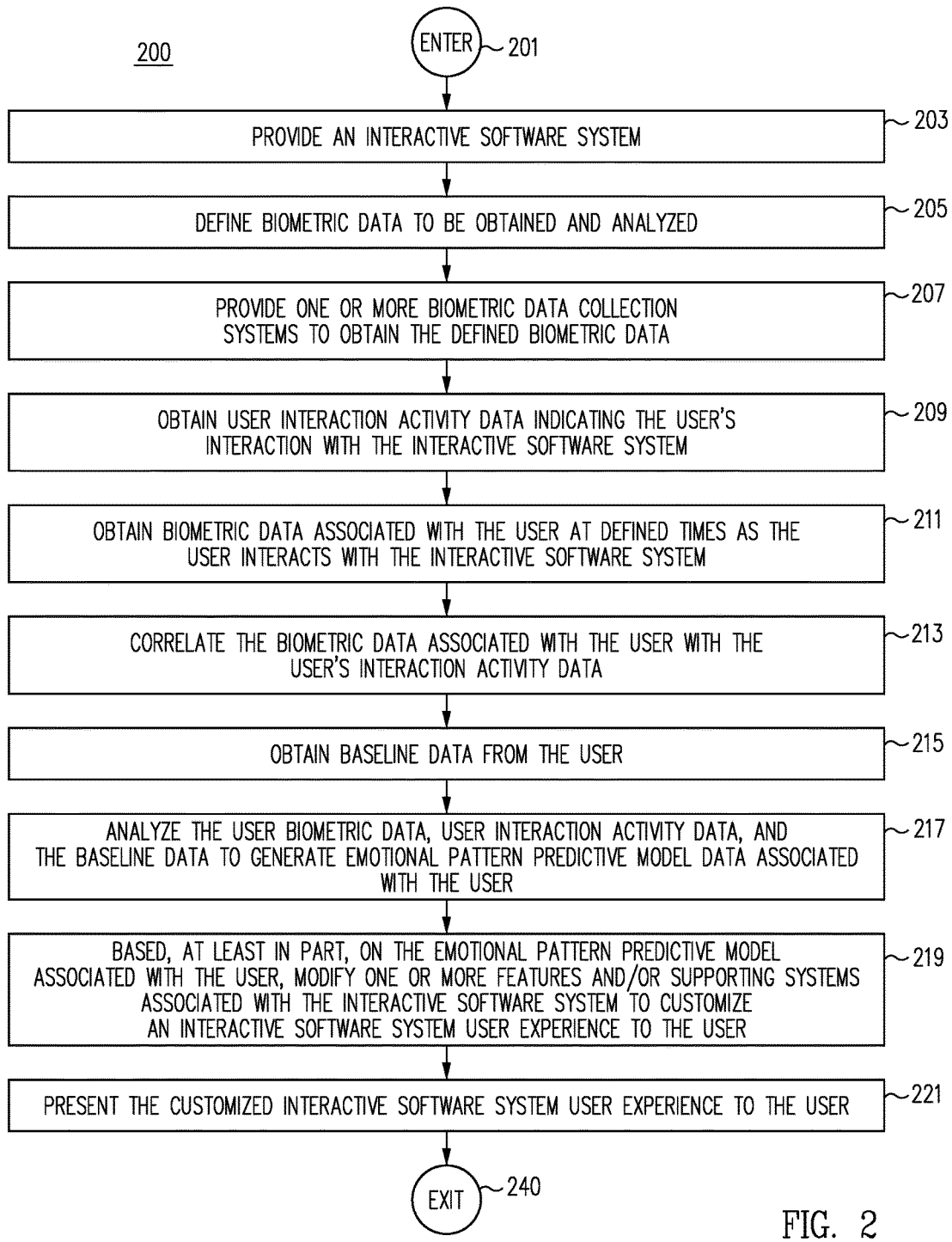
FIG. 2 is a block diagram of a process for building and utilizing interactive software system predictive models using biometric data, in accordance with one embodiment.

FIG. 2 illustrates a functional flow diagram of a process 200 for building and utilizing interactive software system predictive models using biometric data, in accordance with one embodiment. Although a particular sequence of events is described hereafter, more or less events may be included in the process 200, according to various embodiments.

As seen in FIG. 2, in one embodiment process 200 for building and utilizing interactive software system predictive models using biometric data begins at ENTER OPERATION 201 and process flow proceeds to PROVIDE AN INTERACTIVE SOFTWARE SYSTEM OPERATION 203.

In one embodiment, at PROVIDE AN INTERACTIVE SOFTWARE SYSTEM OPERATION 203, an interactive software system is provided for use by one or more users.

In various embodiments, the interactive software system provided at PROVIDE AN INTERACTIVE SOFTWARE SYSTEM OPERATION 203 is any interactive software system as discussed herein, and/or as known in the art at the time of filing, and/or as developed after the time of filing.

In one embodiment, once an interactive software system is provided for use by one or more users at PROVIDE AN INTERACTIVE SOFTWARE SYSTEM OPERATION 203, process flow proceeds to DEFINE BIOMETRIC DATA TO BE OBTAINED AND ANALYZED OPERATION 205.

In one embodiment, at DEFINE BIOMETRIC DATA TO BE OBTAINED AND ANALYZED OPERATION 205, biometric data to be obtained and analyzed is defined.

As noted above, herein, the term "biometric data" refers to a quantitative representation of a predicted emotional state and/or combination of emotional states and/or physiological, behavioral, and/or experiential indications of an emotional state and/or a combination of emotional states.

In various embodiments, the biometric data to be obtained and analyzed of DEFINE BIOMETRIC DATA TO BE OBTAINED AND ANALYZED OPERATION 205 includes, but is not limited to: data associated with the user's pulse; data indicating the user's heart rate; data indicating the user's blood pressure; data indicating the user's facial expression; data indicating whether the user's eyebrows are raised; data indicating the shape of the user's eyebrows; data indicating whether the skin below the user's brow is stretched; data indicating the presence of wrinkles on the user's forehead; data indicating the location of wrinkles on the user's forehead; data acquired from measuring a user's eye rotation; data indicating the extent to which the user's eyelids are opened; data indicating the extent to which the user's upper eyelid is opened; data indicating the extent to which the user's lower eyelid is opened; data indicating whether lines show below the user's lower eyelid; data indicating the amount of the white of the user's eye showing; data indicating the extent to which the user's jaw is open; data indicating whether the user's teeth are parted; data indicating whether the user's mouth is parted; data indicating whether the user's upper lip is raised; data indicating whether the user's lower lip is raised; data indicating the shape of the user's mouth; data indicating whether the user's nose is wrinkled; data indicating whether the user's nostrils are dilated; data indicating whether the user's cheeks are raised; data indicating whether the user's lower jaw juts out; data indicating the user's voice; data indicating the volume and frequency of the user's voice; data indicating the speed with which the user is speaking; data indicating the cadence with which the user is speaking; data indicating the user's body temperature; data indicating whether the user is perspiring; data indicating the amount of perspiration present on the user's skin; data indicating the force with which the user touches hardware associated with the interactive software system; data indicating the speed with which the user touches hardware associated with the interactive software system; data acquired from measuring a user's oxygen saturation; data acquired from measuring a user's blood pressure; data acquired from measuring a user's muscle tension; data acquired from measuring a user's neural activity; data acquired from measuring a user's eye blinking rate; data associated with the user's own characterization of his or her emotional state; historical user data; data associated with a segment of users having characteristics comparable to the user; and/or various other biometric data similar to the specific illustrative examples discussed herein, and/or known in the art at the time of filing, and/or as developed after the time of filing.

In some embodiments, the biometric data of DEFINE BIOMETRIC DATA TO BE OBTAINED AND ANALYZED OPERATION 205 is to be used as an indicator of a user's emotional state. To this end, in some embodiments, emotional state threshold parameter data is defined that provides a means of analyzing that biometric data. In various embodiments, the defined emotional states, with associated emotional state threshold parameter data, include but are not limited to: a happy emotional state or happiness; a sad emotional state or sadness; a surprised emotional state or surprise; a fearful emotional state or fear; a disgusted emotional state or disgust; an angry emotional state or anger; a tense emotional state; a nervous emotional state; a stressed emotional state; an upset emotional state; a frustrated emotional state; a depressed emotional state; a bored emotional state; a fatigued emotional state; an alert emotional state; an excited emotional state; an elated emotional state; a happy emotional state; a contented emotional state; a serene emotional state; a relaxed emotional state; a calm emotional state; and/or any other emotional state as discussed herein, and/or as known in the art at the time of filing, and/or as developed after the time of filing.

In one embodiment, emotional state threshold parameter data associated with each category of biometric data is identified and defined at DEFINE BIOMETRIC DATA TO BE OBTAINED AND ANALYZED OPERATION 205. In one embodiment, specific emotional state threshold parameter data is defined for each category of biometric data to establish whether a user has reached, or is approaching, an associated emotional state. For example, a defined emotional state threshold parameter may provide that when a user's heart is beating at a rate greater than 100 beats per minute, the user is in, or is approaching, a stressed emotional state.

In one embodiment, the emotional state threshold parameter data associated with one or more of the one or more categories of biometric data is identified and defined at DEFINE BIOMETRIC DATA TO BE OBTAINED AND ANALYZED OPERATION 205 based on biometric data obtained from a group of people, and/or norms obtained from various medical data processors and medical institutions. In one embodiment, the emotional state threshold parameter data associated with one or more of the one or more categories of biometric data is identified and defined based on biometric data obtained from the specific user, i.e. the emotional state threshold parameter data is customized to the specific, current user. In some of these embodiments, the emotional state threshold parameter data associated with one of the one or more categories of biometric data from a group of people and/or norms obtained from various medical data processors and medical institutions is initially used as base data and then a customized emotional profile for the specific user is developed based on feedback from the specific user and emotional data monitoring of the specific user.

As noted above, in one embodiment, one type of biometric data defined is the rate of a user's heart beat to provide data about the user's emotional state. For example, in one embodiment, a heart rate emotional state threshold parameter associated with a user's heart beat is defined. In one embodiment, the emotional state threshold parameter may be defined to provide that a user with a heartbeat of over 100 beats per minute is stressed.

In one embodiment, the defined biometric data includes heart rate variability data and a heart rate variability level emotional state threshold parameter associated with a user's heart beat is defined.

In one embodiment, the defined biometric data includes scan path data associated with the user's eye rotation and a scan path emotional state threshold parameter associated with a user's eye rotation is defined. In one embodiment, a fixation period emotional state threshold parameter associated with a user's eye rotation is defined such that if the fixation period emotional state threshold parameter is exceeded and/or is not met, then the user is determined to be in one or more of the defined emotional states.

In one embodiment, the defined biometric data includes skin conductance data and a skin conductance level emotional state threshold parameter associated with a user's perspiration is defined such that if the skin conductance level emotional state threshold parameter is exceeded and/or is not met, then the user is determined to be in one or more of the defined emotional states.

In one embodiment, the defined biometric data includes respiration rate data and a respiration rate emotional state threshold parameter associated with a user's respiration is defined such that if the respiration rate emotional state threshold parameter is exceeded and/or is not met, then the user is determined to be in one or more of the defined emotional states.

In one embodiment, the defined biometric data includes oxygen saturation level data and an oxygen saturation level emotional state threshold parameter associated with a user's oxygen saturation is defined such that if the oxygen saturation level emotional state threshold parameter is exceeded and/or is not met, then the user is determined to be in one or more of the defined emotional states.

In one embodiment, the defined biometric data includes blood pressure level data and a blood pressure level emotional state threshold parameter associated with a user's blood pressure is defined such that if the blood pressure level emotional state threshold parameter is exceeded and/or is not met, then the user is determined to be in one or more of the defined emotional states.

In one embodiment, the defined biometric data includes skin temperature data and a skin temperature emotional state threshold parameter associated with a user's skin temperature is defined such that if the skin temperature emotional state threshold parameter is exceeded and/or is not met, then the user is determined to be in one or more of the defined emotional states.

In one embodiment, the defined biometric data includes muscle tension level data and a muscle tension level emotional state threshold parameter associated with a user's muscle tension is defined such that if the muscle tension level emotional state threshold parameter is exceeded and/or is not met, then the user is determined to be in one or more of the defined emotional states.

In one embodiment, defined biometric data includes neural activity level data and a neural activity level emotional state threshold parameter associated with a user's neural activity is defined such that if the neural activity level emotional state threshold parameter is exceeded and/or is not met, then the user is determined to be in one or more of the defined emotional states.

In one embodiment, the defined biometric data includes eye blink rate data and an eye blink rate emotional state threshold parameter associated with a user's eye blinking is defined such that if the eye blink rate emotional state threshold parameter is exceeded and/or is not met, then the user is determined to be in one or more of the defined emotional states.

In one embodiment, the defined biometric data includes facial muscle movement data and a facial muscle movement emotional state threshold parameter associated with a user's facial expression is defined such that if the facial muscle movement emotional state threshold parameter is exceeded and/or is not met, then the user is determined to be in one or more of the defined emotional states.

In one embodiment, the defined biometric data includes acoustic data and an acoustic characteristics emotional state threshold parameter associated with a user's voice and/or speech is defined such that if the acoustic characteristics emotional state threshold parameter is exceeded and/or is not met, then the user is determined to be in one or more of the defined emotional states.

In one embodiment, the defined biometric data includes contact pressure data and a contact pressure emotional state threshold parameter associated with a user's interaction with hardware associated with the interactive software system is defined such that if the contact pressure emotional state threshold parameter is exceeded and/or is not met, then the user is determined to be in one or more of the defined emotional states.

In one embodiment, the defined biometric data includes contact rate data and a contact rate emotional state threshold parameter associated with a user's interaction with hardware associated with the interactive software system is defined such that if the contact rate emotional state threshold parameter associated is exceeded and/or is not met, then the user is determined to be in one or more of the defined emotional states.

As discussed below, one or more of the embodiments disclosed herein utilize and/or incorporate theories and relationships discovered through analysis of data obtained from a user, multiple users, and/or general study of human emotion. Consequently, the emotional state threshold parameter data represents an ordering of biometric data. In one embodiment, emotional state threshold parameter data is defined for one category of biometric data. In one embodiment, emotional state threshold parameter data are defined for a combination of categories of biometric data.

In various embodiments, the defined biometric data, and any associated emotional state threshold parameters, are defined at DEFINE BIOMETRIC DATA TO BE OBTAINED AND ANALYZED OPERATION 205 such as, but not limited to, any discussed herein, and/or as known in the art at the time of filing, and/or as developed after the time of filing.

In one embodiment, once biometric data to be obtained and analyzed is defined at DEFINE BIOMETRIC DATA TO BE OBTAINED AND ANALYZED OPERATION 205, process flow proceeds to PROVIDE ONE OR MORE BIOMETRIC DATA COLLECTION SYSTEMS TO OBTAIN THE DEFINED BIOMETRIC DATA OPERATION 207.

In one embodiment, at PROVIDE ONE OR MORE BIOMETRIC DATA COLLECTION SYSTEMS TO OBTAIN THE DEFINED BIOMETRIC DATA OPERATION 207, one or more biometric data collection systems are provided to users of the interactive software system to obtain the defined biometric data.

In various embodiments, the one or more biometric data collection systems of PROVIDE ONE OR MORE BIOMETRIC DATA COLLECTION SYSTEMS TO OBTAIN THE DEFINED BIOMETRIC DATA OPERATION 207 include, but are not limited to, one or more of the following: a heart rate monitor associated with an interactive software system, an eye tracker associated with an interactive software system; a biometric data collection system associated with an interactive software system to measure a user's skin conductance level; a biometric data collection system associated with an interactive software system to measure a user's respiration rate; a biometric data collection system associated with an interactive software system to measure a user's oxygen saturation level; a biometric data collection system associated with an interactive software system to measure a user's blood pressure level; a biometric data collection system associated with an interactive software system to measure a user's skin temperature; a biometric data collection system associated with an interactive software system to measure a user's muscle tension level; a biometric data collection system associated with an interactive software system to measure a user's neural activity; a biometric data collection system associated with an interactive software system to measure a user's eye blink rate; a biometric data collection system associated with an interactive software system to measure a user's facial muscle movement; a biometric data collection system associated with an interactive software system to measure a user's acoustic characteristics; a biometric data collection system associated with an interactive software system to measure a user's interaction with hardware associated with an interactive software system; and/or any biometric data collection system as discussed herein, and/or as known in the art at the time of filing, and/or as developed after the time of filing.

In one embodiment, the biometric data of PROVIDE ONE OR MORE BIOMETRIC DATA COLLECTION SYSTEMS TO OBTAIN THE DEFINED BIOMETRIC DATA OPERATION 207 includes the user's pulse and is obtained using a heart rate monitor operatively coupled to, and/or otherwise associated with, a computing system used to implement at least part of the interactive software system. In one embodiment, the biometric data includes the user's blood pressure and is obtained using a blood pressure monitor operatively coupled to, and/or otherwise associated with, a computing system used to implement at least part of the interactive software system. In one embodiment, the biometric data includes the user's facial expression and is obtained using facial expression recognition software and/or hardware operatively coupled to, and/or otherwise associated with, a computing system used to implement at least part of the interactive software system. In one embodiment, the biometric data includes the user's voice and is obtained using speech recognition software operatively coupled to, and/or otherwise associated with, a computing system used to implement at least part of the interactive software system. In one embodiment, the biometric data includes the user's body temperature and is obtained using a temperature sensor operatively coupled to, and/or otherwise associated with, a computing system used to implement at least part of the interactive software system. In one embodiment, the biometric data includes data measuring the user's perspiration and is obtained using a perspiration sensor operatively coupled to, and/or otherwise associated with, a computing system used to implement at least part of the interactive software system. In one embodiment, the biometric data includes the force with which the user interacts with hardware associated with the interactive software system and is obtained using a pressure sensor associated with a keyboard, and/or mouse, touch screen, and/or other user interface system operatively coupled to, and/or otherwise associated with, a computing system used to implement at least part of the interactive software system. In one embodiment, the biometric data includes the speed with which the user interacts with hardware associated with the interactive software system and is obtained using a sensor associated with a keyboard and/or mouse, touch screen, and/or other user interface system operatively coupled to, and/or otherwise associated with, a computing system used to implement at least part of the interactive software system.

Numerous means, methods, systems, algorithms, procedures, and processes are known in the art for detecting emotional states, and/or obtaining biometric data associated with a user. Consequently, a more detailed discussion of any particular means, method, system, algorithm, procedure, and process for detecting emotional states, and/or obtaining biometric data, associated with a user is omitted here to avoid detracting from the invention.

In one embodiment, once one or more biometric data collection systems are provided to users of the interactive software system to obtain the defined biometric data at PROVIDE ONE OR MORE BIOMETRIC DATA COLLECTION SYSTEMS TO OBTAIN THE DEFINED BIOMETRIC DATA OPERATION 207, process flow proceeds to OBTAIN USER INTERACTION ACTIVITY DATA INDICATING THE USER'S INTERACTION WITH THE INTERACTIVE SOFTWARE SYSTEM OPERATION 209.

In one embodiment, at OBTAIN USER INTERACTION ACTIVITY DATA INDICATING THE USER'S INTERACTION WITH THE INTERACTIVE SOFTWARE SYSTEM OPERATION 209, a user's interaction with the interactive software system is monitored and user interaction activity data is obtained indicating the user's interaction with the interactive software system at defined times.

In various embodiments, as a user proceeds to interact with the interactive software system, the user's interactions are monitored and user interaction activity data is obtained indicating what portion of the interactive software system the user was interacting with at a defined time and/or what type of interaction was taking place at a defined time.

In some embodiments, the user interaction activity data is obtained at OBTAIN USER INTERACTION ACTIVITY DATA INDICATING THE USER'S INTERACTION WITH THE INTERACTIVE SOFTWARE SYSTEM OPERATION 209 only at specific times and/or when it is determined that the user is interacting with a specific module, screenshot, data entry field, or other portion of the interactive software system. In some embodiments, the user interaction activity data is obtained at specific modules, screenshots, data entry fields, or other portions of the software system where it is predicted the user may experience a change in emotional state and/or need some form of intervention and/or customer assistance.

In other embodiments, the user interaction activity data is obtained continuously so long as a user is interacting with the interactive software system and the user interaction activity data includes timestamp data and/or location data indicating what portion of the interactive software system the user was interacting with at a given time.

In one embodiment, once a user's interaction with the interactive software system is monitored and user interaction activity data is obtained indicating the user's interaction with the interactive software system at defined times at OBTAIN USER INTERACTION ACTIVITY DATA INDICATING THE USER'S INTERACTION WITH THE INTERACTIVE SOFTWARE SYSTEM OPERATION 209, process flow proceeds to OBTAIN BIOMETRIC DATA ASSOCIATED WITH THE USER AT DEFINED TIMES AS THE USER INTERACTS WITH THE INTERACTIVE SOFTWARE SYSTEM OPERATION 211.

In one embodiment, at OBTAIN BIOMETRIC DATA ASSOCIATED WITH THE USER AT DEFINED TIMES AS THE USER INTERACTS WITH THE INTERACTIVE SOFTWARE SYSTEM OPERATION 211, biometric data associated with the user is obtained using the one or more biometric data collection systems.

According to one embodiment, as a user is interacting with the interactive software system, the biometric data associated with the user is monitored and/or obtained at OBTAIN BIOMETRIC DATA ASSOCIATED WITH THE USER AT DEFINED TIMES AS THE USER INTERACTS WITH THE INTERACTIVE SOFTWARE SYSTEM OPERATION 211 using one or more processes, systems, mechanisms or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed and/or compared to emotional state threshold parameter data associated with the category of biometric data received.

Similar to the collection of user interaction activity data, in some embodiments, the user biometric data is obtained only at specific times and/or when it is determined that the user is interacting with a specific module, screenshot, data entry field, or other portion of the interactive software system. In some embodiments, the user biometric data is obtained at specific modules, screenshots, data entry fields, or other portions of the software system where it is predicted the user may experience a change in emotional state and/or need some form of intervention and/or customer assistance.

In other embodiments, the user biometric data is obtained continuously so long as a user is interacting with the interactive software system and the user biometric data includes timestamp data and/or location data indicating what portion of the interactive software system the user was interacting with at a given time.

In one embodiment, once biometric data associated with the user is obtained using the one or more biometric data collection systems at OBTAIN BIOMETRIC DATA ASSOCIATED WITH THE USER AT DEFINED TIMES AS THE USER INTERACTS WITH THE INTERACTIVE SOFTWARE SYSTEM OPERATION 211, process flow proceeds to CORRELATE THE BIOMETRIC DATA ASSOCIATED WITH THE USER WITH THE USER'S INTERACTION ACTIVITY DATA OPERATION 213.

In one embodiment, at CORRELATE THE BIOMETRIC DATA ASSOCIATED WITH THE USER WITH THE USER'S INTERACTION ACTIVITY DATA OPERATION 213, the biometric data associated with the user of OBTAIN BIOMETRIC DATA ASSOCIATED WITH THE USER AT DEFINED TIMES AS THE USER INTERACTS WITH THE INTERACTIVE SOFTWARE SYSTEM OPERATION 211 is correlated with the user's interaction activity data of OBTAIN USER INTERACTION ACTIVITY DATA INDICATING THE USER'S INTERACTION WITH THE INTERACTIVE SOFTWARE SYSTEM OPERATION 209 at the defined times.

In one embodiment, the user biometric data and the user interaction activity data is correlated at the defined times discussed above so that a direct mapping between the user biometric data and the user's location and/or activity within the interactive software system is obtained. In this way, at CORRELATE THE BIOMETRIC DATA ASSOCIATED WITH THE USER WITH THE USER'S INTERACTION ACTIVITY DATA OPERATION 213 detailed feedback is obtained indicating the user's specific biometric data, and associated emotional state, when the user is interacting with the interactive software system, and a specific module, screenshot, data entry field provided through the interactive software system. Consequently, the feedback obtained is more granular, specific, and accurate than is possible using prior art methods of collecting user feedback.

In various embodiments, the correlated user biometric data and user interaction activity data of CORRELATE THE BIOMETRIC DATA ASSOCIATED WITH THE USER WITH THE USER'S INTERACTION ACTIVITY DATA OPERATION 213 provides more detailed and focused feedback than can be obtained using traditional feedback mechanisms. Consequently, in one embodiment this feedback data can be used by product development and customer care teams to identify operations and/or features of the interactive software system that should be analyzed for improvement, and/or operations and/or features that are particularly effective. In addition, the correlated user biometric data and user interaction activity data can also be used to more accurately predict where the user, and users like the user, might benefit from various forms of intervention and/or offers of customer support. Unlike the prior art, these predicted interventions, and when the interventions take place, are selected based on real biometric feedback of a very focused and detailed nature.

In one embodiment, once the biometric data associated with the user of OBTAIN BIOMETRIC DATA ASSOCIATED WITH THE USER AT DEFINED TIMES AS THE USER INTERACTS WITH THE INTERACTIVE SOFTWARE SYSTEM OPERATION 211 is correlated with the user's interaction activity data of OBTAIN USER INTERACTION ACTIVITY DATA INDICATING THE USER'S INTERACTION WITH THE INTERACTIVE SOFTWARE SYSTEM OPERATION 209 at the defined times at CORRELATE THE BIOMETRIC DATA ASSOCIATED WITH THE USER WITH THE USER'S INTERACTION ACTIVITY DATA OPERATION 213, process flow proceeds to OBTAIN BASELINE DATA FROM THE USER OPERATION 215.

In one embodiment, at OBTAIN BASELINE DATA FROM THE USER OPERATION 215, baseline data, such as, but not limited to, manual feedback data is obtained from the user as the user interacts with the interactive software system.

In one embodiment, at OBTAIN BASELINE DATA FROM THE USER OPERATION 215 manual feedback data is obtained from the user as the user interacts with the interactive software system and includes data indicating when the manual feedback data was obtained. In one embodiment, at OBTAIN BASELINE DATA FROM THE USER OPERATION 215 the manual feedback data is correlated with the biometric data associated with the user and/or the user's interaction activity data at the defined times.

In various embodiments, the manual feedback of OBTAIN BASELINE DATA FROM THE USER OPERATION 215 consists of data representing the user's responses to questions regarding the user's current emotional state and/or data associated with the user's own characterization of his or her emotional state. For instance the user may simply respond to a question like "Are you currently excited, angry, or confused?" The response data is then used to create reference sets and train the predictive models being used and/or created. For instance, and elevated heart rate could indicate, an angry state or an elated state. By obtaining manual feedback, data is obtained indicating which one is the current case. Consequently, in one embodiment, the manual feedback data represents the user's own characterization of his or her emotional state at specific times, and/or at defined locations within the interactive software system. In this way, pseudo-survey type data is collected in real time that is correlated to the specific activity the user is engaged in when the data is collected. This provides more accurate and focused feedback than is available using traditional survey type feedback.

In one embodiment, once baseline data, such as, but not limited to, manual feedback data, is obtained from the user as the user interacts with the interactive software system at OBTAIN BASELINE DATA FROM THE USER OPERATION 215, process flow proceeds to ANALYZE THE USER BIOMETRIC DATA, USER INTERACTION ACTIVITY DATA, AND THE BASELINE DATA TO GENERATE EMOTIONAL PATTERN PREDICTIVE MODEL DATA ASSOCIATED WITH THE USER OPERATION 217.

In one embodiment, at ANALYZE THE USER BIOMETRIC DATA, USER INTERACTION ACTIVITY DATA, AND THE BASELINE DATA TO GENERATE EMOTIONAL PATTERN PREDICTIVE MODEL DATA ASSOCIATED WITH THE USER OPERATION 217, the biometric data associated with the user and correlated to the user's interaction activity data of CORRELATE THE BIOMETRIC DATA ASSOCIATED WITH THE USER WITH THE USER'S INTERACTION ACTIVITY DATA OPERATION 213 and the manual feedback data from the user of OBTAIN BASELINE DATA FROM THE USER OPERATION 215 is analyzed to generate emotional pattern predictive model data representing an emotional pattern predictive model associated with the user.

In one embodiment, by correlating collected user biometric data, the user's interaction activity data, and manual feedback data received from the user, an emotional pattern predictive model is generated indicating the users emotional state, in extreme detail, objectively, and as correlated from multiple sources, at each of the defined times which, in one embodiment, can include the entire timeframe during which the user was interacting with the interactive software system. Therefore, in one embodiment, data indicating the user response to virtually every interaction with the interactive software system can be obtained, aggregated, and analyzed to generate extremely accurate and detailed emotional pattern predictive model data for the user.

In various embodiments, the emotional pattern predictive model data for the user of ANALYZE THE USER BIOMETRIC DATA, USER INTERACTION ACTIVITY DATA, AND THE MANUAL FEEDBACK DATA TO GENERATE EMOTIONAL PATTERN PREDICTIVE MODEL DATA ASSOCIATED WITH THE USER OPERATION 217 provides more detailed and focused feedback than can be obtained using traditional feedback mechanisms. Consequently, in one embodiment, the emotional pattern predictive model data for the user of ANALYZE THE USER BIOMETRIC DATA, USER INTERACTION ACTIVITY DATA, AND THE BASELINE DATA TO GENERATE EMOTIONAL PATTERN PREDICTIVE MODEL DATA ASSOCIATED WITH THE USER OPERATION 217 can be used by product development and customer care teams to identify operations and/or features of the interactive software system that should be analyzed for improvement, and/or operations and/or features that are particularly effective. In addition, the emotional pattern predictive model data can also be used to more accurately predict where the user, and users like the user, might benefit from various forms of intervention and/or offers of customer support. Unlike the prior art, these predicted interventions, and when the interventions take place, are selected based on real biometric feedback of a very focused and detailed nature.

In one embodiment, once the biometric data associated with the user and correlated to the user's interaction activity data and the manual feedback data from the user is analyzed to generate emotional pattern predictive model data representing an emotional pattern predictive model associated with the user at ANALYZE THE USER BIOMETRIC DATA, USER INTERACTION ACTIVITY DATA, AND THE BASELINE DATA TO GENERATE EMOTIONAL PATTERN PREDICTIVE MODEL DATA ASSOCIATED WITH THE USER OPERATION 217, process flow proceeds to BASED, AT LEAST IN PART, ON THE EMOTIONAL PATTERN PREDICTIVE MODEL ASSOCIATED WITH THE USER, MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE USER OPERATION 219.

In one embodiment, at BASED, AT LEAST IN PART, ON THE EMOTIONAL PATTERN PREDICTIVE MODEL ASSOCIATED WITH THE USER, MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE USER OPERATION 219, based, at least in part, on the emotional pattern predictive model associated with the user, one or more features and/or supporting systems associated with the interactive software system are modified to customize an interactive software system user experience to the user.

In various embodiments, the one or more features and/or supporting systems associated with the interactive software system that can be modified at BASED, AT LEAST IN PART, ON THE EMOTIONAL PATTERN PREDICTIVE MODEL ASSOCIATED WITH THE USER, MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE USER OPERATION 219 to customize the interactive software system user experience include, but are not limited to: a sequence with which interview questions are presented to the user; content or topics of the interview questions that are presented to the user; font sizes used while presenting information to the user; length of descriptions provided to the user, themes presented to the user, categories of icons displayed to the user; categories of interface formats presented to the user; interface displays presented to the user, images displayed to the user, assistance resources listed and/or recommended to the user; when assistance resources are offered/provided to the user; wording used in the interactive software system; user recommendations presented to the user, backgrounds presented to the user; background audio presented to the user, avatars and/or icons presented to the user; highlighting mechanisms used and highlighted components presented to the user; support mechanisms presented to the user; marketing devices provided to the user; the timing of providing marketing devices to the user; off-line supplemental actions and recommendations provided to the user; ideal intervention, check-in, or touch points for a given user or user category; and/or any other features and/or supporting systems associated with interactive software systems as discussed herein, and/or as known in the art of time of filing, and/or as developed after the time of filing.

In one embodiment, once based, at least in part, on the emotional pattern predictive model associated with the user, one or more features and/or supporting systems associated with the interactive software system are modified to customize an interactive software system user experience to the user at BASED, AT LEAST IN PART, ON THE EMOTIONAL PATTERN PREDICTIVE MODEL ASSOCIATED WITH THE USER, MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE USER OPERATION 219, process flow proceeds to PRESENT THE CUSTOMIZED INTERACTIVE SOFTWARE SYSTEM USER EXPERIENCE TO THE USER OPERATION 221.

In one embodiment, at PRESENT THE CUSTOMIZED INTERACTIVE SOFTWARE SYSTEM USER EXPERIENCE TO THE USER OPERATION 221, the customized interactive software system user experience is then provided to the user.

In one embodiment, at PRESENT THE CUSTOMIZED INTERACTIVE SOFTWARE SYSTEM USER EXPERIENCE TO THE USER OPERATION 221, the customized interactive software system user experience is provided to the user via a user computing system such as, but not limited to: a server computing system; a workstation; a desktop computing system; a mobile computing system; and/or any other computing system as discussed herein, and/or as known in the art at the time of filing, and/or as developed after the time of filing.

In one embodiment, once the customized interactive software system user experience is then provided to the user at PRESENT THE CUSTOMIZED INTERACTIVE SOFTWARE SYSTEM USER EXPERIENCE TO THE USER OPERATION 221, process flow proceeds to EXIT OPERATION 240.

In one embodiment, at EXIT OPERATION 240 process 200 for building and utilizing interactive software system predictive models using biometric data is exited to await new data.

In one embodiment, emotional pattern predictive model data representing emotional pattern predictive models associated with multiple users is obtained. In one embodiment, the emotional pattern predictive model data representing emotional pattern predictive models associated with multiple users is analyzed to identify one or more user categories. In one embodiment, once one or more user categories are identified, for each user category identified, the emotional pattern predictive model data associated with each of the users of that identified user category is aggregated and analyzed to generate user category emotional pattern profile data for that user category.

In one embodiment, once user category emotional pattern profile data for each user category is generated, a current user begins interacting with the interactive software system. In one embodiment, using one or more on-line and/or off-line sources of data, a determination is made that the current user of the interactive software system is a user of one of the identified user categories. In one embodiment, the identified user category determined to be that of the current user is then associated with the current user.

In one embodiment, the current user's interaction with the interactive software system is monitored and current user interaction activity data is obtained indicating the current user's interaction with the interactive software system at defined times. In one embodiment, the one or more biometric data collection systems are used to obtain biometric data associated with the current user at defined times as the current user interacts with the interactive software system. In one embodiment, the biometric data associated with the current user is correlated with the current user's interaction activity data.

In one embodiment, the biometric data associated with the current user correlated to the current user's interaction activity data is compared with the user category emotional pattern profile data for the user category associated with the current user. In one embodiment, if a deviation is found between the biometric data associated with the current user correlated to the current user's interaction activity data and the user category emotional pattern profile data for the user category associated with the current user, one or more features and/or supporting systems associated with the interactive software system are modified to customize an interactive software system user experience to the current user. In one embodiment, the customized interactive software system user experience is then presented to the current user.

Figure 3:
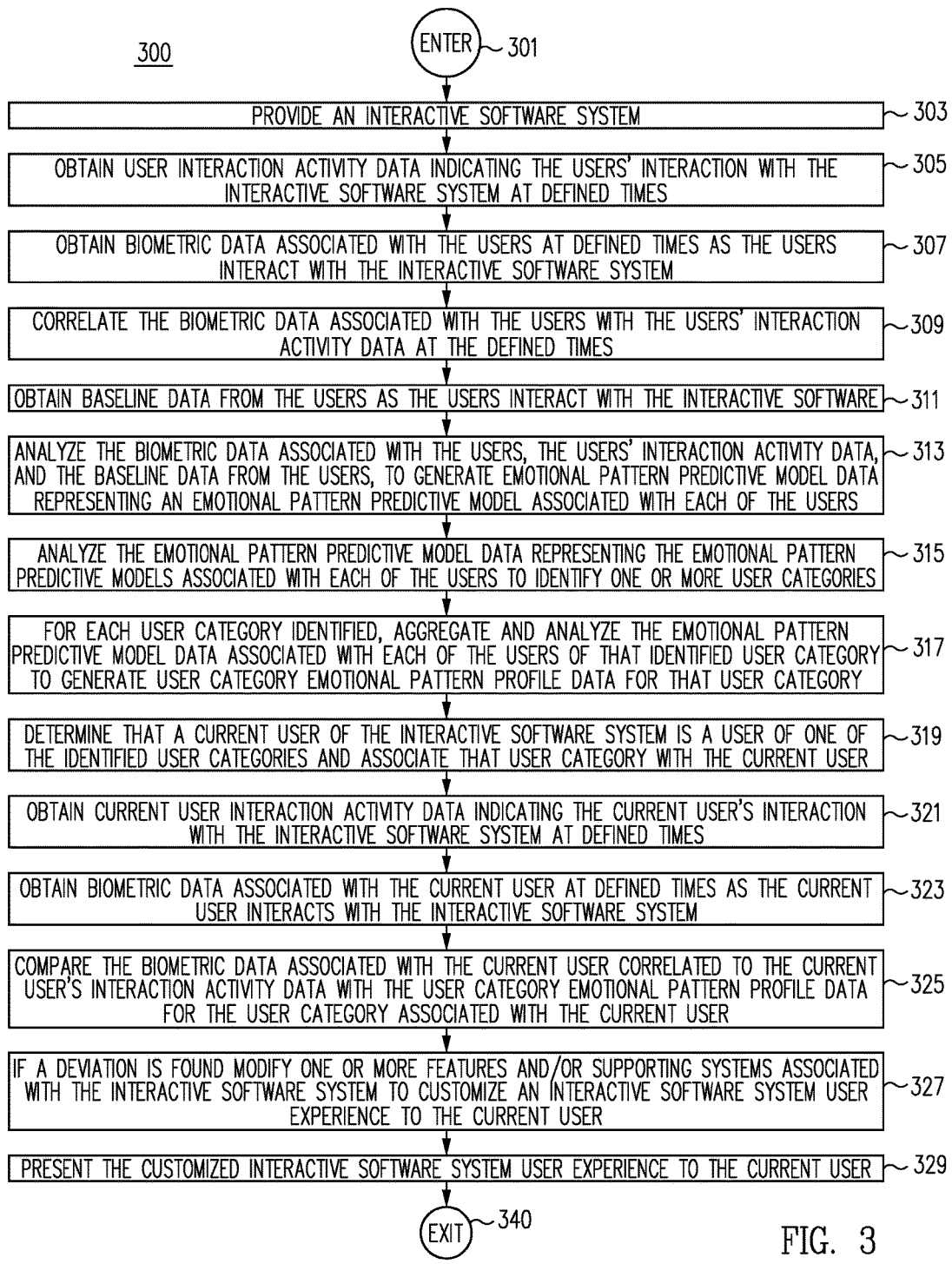
FIG. 3 is a block diagram of a process for building and utilizing interactive software system predictive models using biometric data, in accordance with one embodiment.

FIG. 3 illustrates a functional flow diagram of a process 300 for building and utilizing interactive software system predictive models using biometric data, in accordance with one embodiment. Although a particular sequence of events is described hereafter, more or less events may be included in the process 300, according to various embodiments.

As seen in FIG. 3, in one embodiment process 300 for building and utilizing interactive software system predictive models using biometric data begins at ENTER OPERATION 301 and process flow proceeds to PROVIDE AN INTERACTIVE SOFTWARE SYSTEM OPERATION 303.

In one embodiment, at PROVIDE AN INTERACTIVE SOFTWARE SYSTEM OPERATION 303; OBTAIN USER INTERACTION ACTIVITY DATA INDICATING THE USERS' INTERACTION WITH THE INTERACTIVE SOFTWARE SYSTEM AT DEFINED TIMES OPERATION 305; OBTAIN BIOMETRIC DATA ASSOCIATED WITH THE USERS AT DEFINED TIMES AS THE USERS INTERACT WITH THE INTERACTIVE SOFTWARE SYSTEM OPERATION 307; CORRELATE THE BIOMETRIC DATA ASSOCIATED WITH THE USERS WITH THE USERS' INTERACTION ACTIVITY DATA AT THE DEFINED TIMES OPERATION 309; OBTAIN BASELINE DATA FROM THE USERS AS THE USERS INTERACT WITH THE INTERACTIVE SOFTWARE OPERATION 311; and ANALYZE THE BIOMETRIC DATA ASSOCIATED WITH THE USERS, THE USERS' INTERACTION ACTIVITY DATA, AND THE BASELINE DATA FROM THE USERS, TO GENERATE EMOTIONAL PATTERN PREDICTIVE MODEL DATA REPRESENTING AN EMOTIONAL PATTERN PREDICTIVE MODEL ASSOCIATED WITH EACH OF THE USERS OPERATION 313, emotional pattern predictive model data representing emotional pattern predictive models associated with multiple users is obtained using one or more embodiments of process 200 for building and utilizing interactive software system predictive models using biometric data discussed above with respect to FIG. 2.

In one embodiment, once the biometric data associated with each user and correlated to each user's interaction activity data and the manual feedback data from each user is analyzed to generate emotional pattern predictive model data representing an emotional pattern predictive model associated with each user at ANALYZE THE BIOMETRIC DATA ASSOCIATED WITH THE USERS, THE USERS' INTERACTION ACTIVITY DATA, AND THE BASELINE DATA FROM THE USERS, TO GENERATE EMOTIONAL PATTERN PREDICTIVE MODEL DATA REPRESENTING AN EMOTIONAL PATTERN PREDICTIVE MODEL ASSOCIATED WITH EACH OF THE USERS OPERATION 313, process flow proceeds to ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315.

In one embodiment, at ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315, the emotional pattern predictive model data representing emotional pattern predictive models associated with multiple users is analyzed to identify one or more user categories.

In various embodiments, the one or more user categories can be defined at ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315 based on any common parameters desired. For instance, one or more user categories can include generalized user categories such as, but not limited to: a type "A" personality user category; a relaxed personality user category; a detailed oriented user category; a mobile or on the go user category; and/or any other generalized user category as discussed herein, and/or as known in the art at the time of filing, and/or as developed after the time of filing.

In addition, one or more user categories can include more specifically focused user categories associated with a specific type of interactive software system, such as a tax preparation software application with specific illustrative examples such as, but not limited to: a tax adverse or tax anxious user category; a tax neutral user category; a complexity adverse user category; a simplicity adverse user category; and/or any other specifically focused user category as discussed herein, and/or as known in the art at the time of filing and/or as developed after the time of filing.

In one embodiment, once the emotional pattern predictive model data representing emotional pattern predictive models associated with multiple users is analyzed to identify one or more user categories at ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315, process flow proceeds to FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317.

In one embodiment, at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317, for each user category identified at ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315, the emotional pattern predictive model data associated with each of the users of that identified user category is aggregated and analyzed to generate user category emotional pattern profile data for that user category.

In one embodiment, the user category emotional pattern profile data for each user category is collected at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317 by aggregating the individual emotional pattern profile data for each user determined to be a member of the user category. In one embodiment, the user category emotional pattern profile data is then analyzed at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317 to identify specific traits, parameters, and biometric data common to most, many, or all, of the individual users determined to be members of the user category.

In one embodiment, in addition to identifying specific traits, parameters, and correlated biometric data, off-line data, i.e. data not directly related to the user's biometric data, is obtained from the user's at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317 and common parameters within the off-line data identified. Specific examples of off-line data correlated to the user category emotional pattern profile data include, but are not limited to: demographic data associated with the users determined to be members of the user category; geographic data associated with users determined to be members of the user category; economic data, such as income data, associated with users determined to be members of the user category; political affiliation data associated with users determined to be members of the user category; and/or any other off-line data as discussed herein, and/or as known in the art at the time of filing, and/or as developed after the time of filing. In addition, the off-line data can include data representing responses to simple questions presented to the user such as "What personality type are you?" or "How do you feel about the tax preparation process?"

In one embodiment, at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317 the off-line data is used to determine at least an initial user category to assign to any new user for which no biometric data has yet been collected, and/or a user who does not have access to biometric data collection systems and therefore cannot provide biometric data. In one embodiment, off-line data associated with the new user is obtained from the user and then used to match the new user to one of the user categories based on the off-line data associated with the user categories.

In one embodiment, once for each user category identified at ANALYZE THE EMOTIONAL PATTERN PREDICTIVE MODEL DATA REPRESENTING THE EMOTIONAL PATTERN PREDICTIVE MODELS ASSOCIATED WITH EACH OF THE USERS TO IDENTIFY ONE OR MORE USER CATEGORIES OPERATION 315, the emotional pattern predictive model data associated with each of the users of that identified user category is aggregated and analyzed to generate user category emotional pattern profile data for that user category at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317, process flow proceeds to DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319.

In one embodiment, at DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319, a current user begins interacting with the interactive software system and a determination is made that the current user of the interactive software system is a user of one of the identified user categories.

In one embodiment, once user category emotional pattern profile data for each user category is generated at FOR EACH USER CATEGORY IDENTIFIED, AGGREGATE AND ANALYZE THE EMOTIONAL PATTERN PREDICTIVE MODEL DATA ASSOCIATED WITH EACH OF THE USERS OF THAT IDENTIFIED USER CATEGORY TO GENERATE USER CATEGORY EMOTIONAL PATTERN PROFILE DATA FOR THAT USER CATEGORY OPERATION 317, a current user begins interacting with the interactive software system at DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319.

In one embodiment, using one or more on-line and/or off-line sources of data, a determination is made that the current user of the interactive software system is a user of one of the identified user categories at DETERMINE THAT A CURRENT USER OF THE INTERACTIVE SOFTWARE SYSTEM IS A USER OF ONE OF THE IDENTI- FIED USER CATEGORIES AND ASSOCIATE THAT USER CATEGORY WITH THE CURRENT USER OPERATION 319. In one embodiment, if a current user has already used the interactive software system, emotional pattern predictive model data associated with the user has already been obtained, and a user category has already been assigned to the user.

In one embodiment, the current user of DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319 is a new user, however, as the user interacts with the interactive software system biometric data is collected and once enough biometric data is collected, a determination is made regarding which user category is most closely matched to the current user.

In addition, as noted above, in one embodiment, the off-line data is used to determine at least an initial user category to assign to any new user for which no biometric data has yet been collected, and/or a user who does not have access to biometric data collection systems and therefore cannot provide biometric data. In one embodiment, off-line data associated with the new user is obtained from the user and then used to match the new user to one of the user categories based on the off-line data associated with the user categories.

In one embodiment, once a user category is determined to be that of the current user, the identified user category determined to be that of the current user is associated with the current user. Consequently, at least until contradictory data is received, the current user is analyzed in light of the user category emotional pattern profile data associated with the category assigned to the user. It is also therefore assumed that the emotional pattern predictive model data generated as the current user interacts with interactive software system will resemble the user category emotional pattern profile data associated with the category assigned to the user.

In one embodiment, once a current user begins interacting with the interactive software system and a determination is made that the current user of the interactive software system is a user of one of the identified user categories and the identified user category determined to be that of the current user is associated with the current user at DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319, process flow proceeds to OBTAIN CURRENT USER INTERACTION ACTIVITY DATA INDICATING THE CURRENT USER'S INTERACTION WITH THE INTERACTIVE SOFTWARE SYSTEM AT DEFINED TIMES OPERATION 321.

In one embodiment, at OBTAIN CURRENT USER INTERACTION ACTIVITY DATA INDICATING THE CURRENT USER'S INTERACTION WITH THE INTERACTIVE SOFTWARE SYSTEM AT DEFINED TIMES OPERATION 321, the current user's interaction with the interactive software system is monitored and current user interaction activity data is obtained indicating the current user's interaction with the interactive software system at defined times. A discussion of this process is provided above with respect to OBTAIN USER INTERACTION ACTIVITY DATA INDICATING THE USER'S INTERACTION WITH THE INTERACTIVE SOFTWARE SYSTEM OPERATION 209 of FIG. 2.

In one embodiment, once the current user's interaction with the interactive software system is monitored and current user interaction activity data is obtained indicating the current user's interaction with the interactive software system at defined times at OBTAIN CURRENT USER INTERACTION ACTIVITY DATA INDICATING THE CURRENT USER'S INTERACTION WITH THE INTERACTIVE SOFTWARE SYSTEM AT DEFINED TIMES OPERATION 321, process flow proceeds to OBTAIN BIOMETRIC DATA ASSOCIATED WITH THE CURRENT USER AT DEFINED TIMES AS THE CURRENT USER INTERACTS WITH THE INTERACTIVE SOFTWARE SYSTEM OPERATION 323.

In one embodiment, at OBTAIN BIOMETRIC DATA ASSOCIATED WITH THE CURRENT USER AT DEFINED TIMES AS THE CURRENT USER INTERACTS WITH THE INTERACTIVE SOFTWARE SYSTEM OPERATION 323, the one or more biometric data collection systems are used to obtain biometric data associated with the current user at defined times as the current user interacts with the interactive software system. A discussion of this process is provided above with respect to OBTAIN BIOMETRIC DATA ASSOCIATED WITH THE USER AT DEFINED TIMES AS THE USER INTERACTS WITH THE INTERACTIVE SOFTWARE SYSTEM OPERATION 211 of FIG. 2.

In one embodiment, once the one or more biometric data collection systems are used to obtain biometric data associated with the current user at defined times as the current user interacts with the interactive software system at OBTAIN BIOMETRIC DATA ASSOCIATED WITH THE CURRENT USER AT DEFINED TIMES AS THE CURRENT USER INTERACTS WITH THE INTERACTIVE SOFTWARE SYSTEM OPERATION 323, process flow proceeds to COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325.

In one embodiment, at COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325, the biometric data associated with the current user correlated to the current user's interaction activity data of OBTAIN BIOMETRIC DATA ASSOCIATED WITH THE CURRENT USER AT DEFINED TIMES AS THE CURRENT USER INTERACTS WITH THE INTERACTIVE SOFTWARE SYSTEM OPERATION 323 is compared with the user category emotional pattern profile data for the user category associated with the current user of DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319.

As noted above, in one embodiment, once a user category is determined to be that of the current user, the identified user category determined to be that of the current user is associated with the current user. Consequently, at least until contradictory data is received, the current user is analyzed at COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325 in light of the user category emotional pattern profile data associated with the category assigned to the user. It is also therefore assumed that the emotional pattern predictive model data generated as the current user interacts with interactive software system will resemble the user category emotional pattern profile data associated with the category assigned to the user.

In one embodiment, the biometric data associated with the current user correlated to the current user's interaction activity data of OBTAIN BIOMETRIC DATA ASSOCIATED WITH THE CURRENT USER AT DEFINED TIMES AS THE CURRENT USER INTERACTS WITH THE INTERACTIVE SOFTWARE SYSTEM OPERATION 323 is compared with the user category emotional pattern profile data for the user category associated with the current user of DETERMINE THAT A CURRENT USER OF THE INTERACTIVE SOFTWARE SYSTEM IS A USER OF ONE OF THE IDENTIFIED USER CATEGORIES AND ASSOCIATE THAT USER CATEGORY WITH THE CURRENT USER OPERATION 319 once at COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325, process flow proceeds to IF A DEVIATION IS FOUND MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE CURRENT USER OPERATION 327.

In one embodiment, at IF A DEVIATION IS FOUND MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE CURRENT USER OPERATION 327, if a deviation is found between the biometric data associated with the current user correlated to the current user's interaction activity data and the user category emotional pattern profile data for the user category associated with the current user at COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325, one or more features and/or supporting systems associated with the interactive software system are modified to customize an interactive software system user experience to the current user.

A discussion of the one or more features and/or supporting systems associated with the software system that can be modified to customize the interactive software system user experience to the current user is provided above with respect to BASED, AT LEAST IN PART, ON THE EMOTIONAL PATTERN PREDICTIVE MODEL ASSOCIATED WITH THE USER, MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE USER OPERATION 219 of FIG. 2.

In one embodiment, once if a deviation is found between the biometric data associated with the current user correlated to the current user's interaction activity data and the user category emotional pattern profile data for the user category associated with the current user at COMPARE THE BIOMETRIC DATA ASSOCIATED WITH THE CURRENT USER CORRELATED TO THE CURRENT USER'S INTERACTION ACTIVITY DATA WITH THE USER CATEGORY EMOTIONAL PATTERN PROFILE DATA FOR THE USER CATEGORY ASSOCIATED WITH THE CURRENT USER OPERATION 325, one or more features and/or supporting systems associated with the interactive software system are modified to customize an interactive software system user experience to the current user at IF A DEVIATION IS FOUND MODIFY ONE OR MORE FEATURES AND/OR SUPPORTING SYSTEMS ASSOCIATED WITH THE INTERACTIVE SOFTWARE SYSTEM TO CUSTOMIZE AN INTERACTIVE SOFTWARE SYSTEM USER EXPERIENCE TO THE CURRENT USER OPERATION 327, process flow proceeds to PRESENT THE CUSTOMIZED INTERACTIVE SOFTWARE SYSTEM USER EXPERIENCE TO THE CURRENT USER OPERATION 329.

In one embodiment, at PRESENT THE CUSTOMIZED INTERACTIVE SOFTWARE SYSTEM USER EXPERIENCE TO THE CURRENT USER OPERATION 329, the customized interactive software system user experience is then presented to the current user.

In one embodiment, once the customized interactive software system user experience is then presented to the current user at PRESENT THE CUSTOMIZED INTERACTIVE SOFTWARE SYSTEM USER EXPERIENCE TO THE CURRENT USER OPERATION 329, process flow proceeds to EXIT OPERATION 340.

In one embodiment, at EXIT OPERATION 340 process 300 for building and utilizing interactive software system predictive models using biometric data is exited to await new data.

The disclosed processes for building and utilizing interactive software system predictive models using biometric data provide a technical solution for obtaining more detailed, connected, and reliable feedback data from users of an interactive software system that has a more empirical and objective basis. Then this feedback data is used to create predictive models that allow for targeted product diagnosis, targeted interventions, targeted marketing/upsell attempts, and grouping and analysis of feedback and user categories and feedback sources. Consequently, the disclosed processes for building and utilizing interactive software system predictive models using biometric data provide a technical solution to the long standing technical problem in the interactive software system field of a lack of detailed, objective, connected, and reliable feedback from users.

The disclosed processes for building and utilizing interactive software system predictive models using biometric data do not encompass, embody, or preclude other forms of innovation in the area of interactive software system feedback, product analysis, and customer support. In addition, the disclosed processes for building and utilizing interactive software system predictive models using biometric data are not related to any fundamental economic practice, fundamental data processing practice, mental steps, or pen and paper based solutions, and is, in fact, directed to providing solutions to the relatively new problems associated with obtaining accurate feedback regarding an individual user's experience with an interactive software system. Consequently, the disclosed processes for building and utilizing interactive software system predictive models using biometric data are not directed to, do not encompass, and are not merely, an abstract idea or concept.

In addition, the disclosed processes for building and utilizing interactive software system predictive models using biometric data provide for significant improvements to the technical fields of interactive software system analysis, information dissemination, data processing, data management, and user experience.

In addition, by customizing the user experience based on the biometric data and analysis described herein, the user experience associated with the interactive software system can be improved and customized to a selected user's emotional state at the time the user is interacting with the interactive software system. According to one embodiment, by improving the user experience using the biometric data, the interactive software system user experience is personal to the user and dynamically adapted to the user's current emotional state. Thus, using the disclosed processes for building and utilizing interactive software system predictive models using biometric data results in more efficient use of resources by reducing the number of instances where data is entered by a user and processed by the interactive system only for the user to abandon the interactive software system. Consequently, using the disclosed processes for building and utilizing interactive software system predictive models using biometric data results in the use of fewer processing cycles, reduced and more efficient use of memory, and reduced use of communications bandwidth to relay data. As a result computing systems and networks implementing the disclosed processes for building and utilizing interactive software system predictive models using biometric data are faster, more efficient, and more effective.

According to one embodiment, after the user experience is individualized and as a user is interacting with the interactive software system, the biometric data associated with that user is monitored and/or obtained on a periodic or ongoing basis using one or more processes, systems, mechanisms, and/or means for obtaining biometric data, as discussed herein, and/or as known in the art at the time of filing, and/or as developed after the time of filing. In one embodiment, the biometric data associated with the user is provided to one or more analytics modules. In one embodiment, under the direction of the one or more analytics modules, the biometric data associated with the user is analyzed and/or compared to the emotional state threshold parameter data associated with the category of biometric data received. In one embodiment, as the biometric data associated with the user changes, the user experience is re-adapted to the users changing emotional state by recombining the user experience components dynamically, and in relative real-time.

Therefore, the various embodiments of the disclosure, and their associated benefits, as discussed herein, improve the technical fields of interactive software systems and data processing by using biometric data to dynamically individualize the user experience provided through the interactive software system in an evolving, dynamic, manner that is not only customized to an individual user, but also to the varying emotional states of a specific individual user. Consequently, the disclosed embodiments amount to significantly more than an implementation of the abstract idea of customizing a user experience to a specific user.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "associating," "aggregating," "collecting," "creating," "comparing," "defining," "determining," "generating," "identifying," "initiating," "obtaining," "providing," "processing," "presenting," "receiving," "storing," "searching," "selecting," "transferring," etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient and/or efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

As discussed above, using the above embodiments, with little or no modification and/or input, there is considerable flexibility, adaptability, and opportunity for customization to meet the specific needs of various users under numerous circumstances. In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A method for building and utilizing interactive software system predictive models using biometric data comprising:
   providing an interactive software system;
   defining biometric data to be obtained and analyzed;
   providing one or more biometric data collection systems to obtain the defined biometric data;
   monitoring a user's interaction with the interactive software system and obtaining user interaction activity data indicating the user's interaction with the interactive software system at defined times;
   using the one or more biometric data collection systems to obtain biometric data associated with the user at defined times as the user interacts with the interactive software system;
   correlating the biometric data associated with the user with the user's interaction activity data at the defined times;
   obtaining baseline data associated with the user, the baseline data including data indicating when the baseline data was obtained;
   analyzing the biometric data associated with the user and correlated to the user's interaction activity data and the baseline data associated with the user, to generate emotional pattern predictive model data representing an emotional pattern predictive model associated with the user;
   based, at least in part, on the emotional pattern predictive model associated with the user, modifying one or more features and/or supporting systems associated with the interactive software system to customize an interactive software system user experience to the user; and
   presenting the customized interactive software system user experience to the user.

2. The method for building and utilizing interactive software system predictive models using biometric data of claim 1, wherein the interactive software system is selected from the group of interactive software systems consisting of:
   a computing system implemented tax preparation software system;
   a network accessed tax preparation software system;
   a web-based tax preparation software system;
   a cloud-based tax preparation software system;
   a computing system implemented business management software system;
   a network accessed business management software system;
   a web-based business management software system;
   a cloud-based business management software system;
   a computing system implemented accounting software system;
   a network accessed accounting software system;
   a web-based accounting software system;
   a cloud-based accounting software system;
   a computing system implemented financial management system;
   a network accessed financial management system;
   a web-based financial management system; and
   a cloud-based financial management system.

3. The method for building and utilizing interactive software system predictive models using biometric data of claim 1, wherein the biometric data includes at least one of the biometric data selected from the group of biometric data consisting of:
   data acquired from measuring the user's heart beat;
   data acquired from measuring the user's eye rotation;
   data acquired from measuring the user's eye dilation;
   data acquired from measuring the user's skin color;
   data acquired from measuring the user's perspiration;
   data acquired from measuring the user's respiration;
   data acquired from measuring the user's oxygen saturation;
   data acquired from measuring the user's blood pressure
   data acquired from measuring the user's skin temperature;
   data acquired from measuring the user's muscle tension;
   data acquired from measuring the user's neural activity;
   data acquired from measuring the user's eye blinking;
   data acquired from measuring the user's facial expression;
   data acquired from measuring the user's voice and/or speech; and data acquired from measuring the user's interactions with hardware associated with the user's interaction with the interactive software system.

4. The method for building and utilizing interactive software system predictive models using biometric data of claim 1, wherein an emotional state of the user at a given time is determined based on the biometric data received at that given time and includes at least one of the emotional states selected from the group of emotional states consisting of:
a happy emotional state or happiness;
a sad emotional state or sadness;
a surprised emotional state or surprise;
a fearful emotional state or fear;
a disgusted emotional state or disgust;
an angry emotional state or anger;
a tense emotional state;
a nervous emotional state;
a stressed emotional state;
an upset emotional state;
a frustrated emotional state;
a depressed emotional state;
a bored emotional state;
a fatigued emotional state;
an alert emotional state;
an excited emotional state;
an elated emotional state;
a happy emotional state;
a contented emotional state;
a serene emotional state;
a relaxed emotional state; and
a calm emotional state.

5. The method for building and utilizing interactive software system predictive models using biometric data of claim 1, wherein the biometric data associated with a user is obtained continuously as the user interacts with the interactive software system.

6. The method for building and utilizing interactive software system predictive models using biometric data of claim 1, wherein the biometric data associated with a user is obtained on a periodic basis and/or at specific locations within the interactive software system as the user interacts with the interactive software system.

7. The method for building and utilizing interactive software system predictive models using biometric data of claim 1, wherein the baseline data includes manual feedback data obtained from the user via user responses to one or more questions provided to the user.

8. The method for building and utilizing interactive software system predictive models using biometric data of claim 7, wherein the manual feedback data obtained from the user is combined with additional baseline data associated with the user to create reference set data for the user.

9. The method for building and utilizing interactive software system predictive models using biometric data of claim 8, wherein the additional baseline data associated with the user includes one or more of:
data acquired from the user's own characterization of his or her emotional state;
data acquired from historical user data; and
data acquired from a segment of users having characteristics comparable to the user.

10. The method for building and utilizing interactive software system predictive models using biometric data of claim 1, wherein modifying one or more features and/or supporting systems associated with the interactive software system to customize an interactive software system user experience to the user includes modifying one or more of the following:
a sequence with which interview questions are presented to the user;
content or topics of the interview questions that are presented to the user;
font sizes used while presenting information to the user;
length of descriptions provided to the user;
themes presented to the user;
categories of icons displayed to the user;
categories of interface formats presented to the user;
interface displays presented to the user;
interface devices suggested to the user;
images displayed to the user;
assistance resources listed and/or recommended to the user;
when assistance resources are offered/provided to the user;
wording used in the interactive software system;
ordering of interactions used in the interactive software system;
user recommendations presented to the user;
backgrounds presented to the user;
background audio presented to the user;
avatars and/or icons presented to the user;
highlighting mechanisms used and highlighted components presented to the user;
support mechanisms presented to the user;
marketing devices provided to the user;
the timing of providing marketing devices to the user; and
off-line supplemental actions and recommendations provided to the user.

11. The method for building and utilizing interactive software system predictive models using biometric data of claim 1, wherein the customized interactive software system user experience is presented to the user via at least one computing system selected from the group of computing systems consisting of:
a server computing system;
a workstation;
a desktop computing system;
a user wearable computing system; and
a mobile computing system.

12. A method for building and utilizing interactive software system predictive models using biometric data comprising:
providing an interactive software system;
defining biometric data to be obtained and analyzed;
providing one or more biometric data collection systems to obtain the defined biometric data;
monitoring two or more users' interaction with the interactive software system and obtaining user interaction activity data indicating the users' interaction with the interactive software system at defined times;
using the one or more biometric data collection systems to obtain biometric data associated with the users at defined times as the users interact with the interactive software system;
correlating the biometric data associated with the users with the users' interaction activity data at the defined times;
obtaining baseline data associated with the users, the baseline data including data indicating when the baseline data was obtained;
analyzing the biometric data associated with the users and correlated to the users' interaction activity data and the baseline data associated with the users, to generate emotional pattern predictive model data representing an emotional pattern predictive model associated with each of the users;

analyzing the emotional pattern predictive model data representing the emotional pattern predictive models associated with each of the users to identify one or more user categories;

identifying one or more user categories;

for each user category identified, aggregating and analyzing the emotional pattern predictive model data associated with each of the users of that identified user category to generate user category emotional pattern profile data for that user category;

determining that a current user of the interactive software system is a user of one of the identified user categories and associating that user category with the current user;

monitoring the current user's interaction with the interactive software system and obtaining current user interaction activity data indicating the current user's interaction with the interactive software system at defined times;

using the one or more biometric data collection systems to obtain biometric data associated with the current user at defined times as the current user interacts with the interactive software system;

correlating the biometric data associated with the current user with the current user's interaction activity data;

comparing the biometric data associated with the current user correlated to the current user's interaction activity data with the user category emotional pattern profile data for the user category associated with the current user; and if a deviation is found between the biometric data associated with the current user correlated to the current user's interaction activity data with the user category emotional pattern profile data for the user category associated with the current user, modifying one or more features and/or supporting systems associated with the interactive software system to customize an interactive software system user experience to the current user; and presenting the customized interactive software system user experience to the current user.

13. The method for building and utilizing interactive software system predictive models using biometric data of claim 12, wherein the interactive software system is selected from the group of interactive software systems consisting of:
    a computing system implemented tax preparation software system;
    a network accessed tax preparation software system;
    a web-based tax preparation software system;
    a cloud-based tax preparation software system;
    a computing system implemented business management software system;
    a network accessed business management software system;
    a web-based business management software system;
    a cloud-based business management software system;
    a computing system implemented accounting software system;
    a network accessed accounting software system;
    a web-based accounting software system;
    a cloud-based accounting software system;
    a computing system implemented financial management system;
    a network accessed financial management system;
    a web-based financial management system; and
    a cloud-based financial management system.

14. The method for building and utilizing interactive software system predictive models using biometric data of claim 12, wherein the biometric data includes at least one of the biometric data selected from the group of biometric data consisting of:
    data acquired from measuring the user's heart beat;
    data acquired from measuring the user's eye rotation;
    data acquired from measuring the user's eye dilation;
    data acquired from measuring the user's skin color;
    data acquired from measuring the user's perspiration;
    data acquired from measuring the user's respiration;
    data acquired from measuring the user's oxygen saturation;
    data acquired from measuring the user's blood pressure
    data acquired from measuring the user's skin temperature;
    data acquired from measuring the user's muscle tension;
    data acquired from measuring the user's neural activity;
    data acquired from measuring the user's eye blinking;
    data acquired from measuring the user's facial expression;
    data acquired from measuring the user's voice and/or speech; and
    data acquired from measuring the user's interactions with hardware associated with the user's interaction with the interactive software system.

15. The method for building and utilizing interactive software system predictive models using biometric data of claim 12, wherein an emotional state of the user at a given time is determined based on the biometric data received at that given time and includes at least one of the emotional states selected from the group of emotional states consisting of:
    a happy emotional state or happiness;
    a sad emotional state or sadness;
    a surprised emotional state or surprise;
    a fearful emotional state or fear;
    a disgusted emotional state or disgust;
    an angry emotional state or anger;
    a tense emotional state;
    a nervous emotional state;
    a stressed emotional state;
    an upset emotional state;
    a frustrated emotional state;
    a depressed emotional state;
    a bored emotional state;
    a fatigued emotional state;
    an alert emotional state;
    an excited emotional state;
    an elated emotional state;
    a happy emotional state;
    a contented emotional state;
    a serene emotional state;
    a relaxed emotional state; and
    a calm emotional state.

16. The method for building and utilizing interactive software system predictive models using biometric data of claim 12, wherein the biometric data associated with a current user is obtained continuously as the current user interacts with the interactive software system.

17. The method for building and utilizing interactive software system predictive models using biometric data of claim 12, wherein the biometric data associated with a current user is obtained on a periodic basis and/or at specific locations within the interactive software system as the current user interacts with the interactive software system.

18. The method for building and utilizing interactive software system predictive models using biometric data of claim 12, wherein the baseline data includes manual feedback data obtained from the user via user responses to one or more questions provided to the user.

19. The method for building and utilizing interactive software system predictive models using biometric data of claim 18, wherein the manual feedback data obtained from the user is combined with additional baseline data associated with the user to create reference set data for the user.

20. The method for building and utilizing interactive software system predictive models using biometric data of claim 19, wherein the additional baseline data associated with the user includes one or more of:
   data acquired from the user's own characterization of his or her emotional state;
   data acquired from historical user data; and
   data acquired from a segment of users having characteristics comparable to the user.

21. The method for building and utilizing interactive software system predictive models using biometric data of claim 12, wherein modifying one or more features and/or supporting systems associated with the interactive software system to customize an interactive software system user experience to the user includes modifying one or more of the following:
   a sequence with which interview questions are presented to the user;
   content or topics of the interview questions that are presented to the user;
   font sizes used while presenting information to the user;
   length of descriptions provided to the user;
   themes presented to the user;
   categories of icons displayed to the user;
   categories of interface formats presented to the user;
   interface displays presented to the user;
   interface devices suggested to the user;
   images displayed to the user;
   assistance resources listed and/or recommended to the user;
   when assistance resources are offered/provided to the user;
   wording used in the interactive software system;
   ordering of interactions used in the interactive software system;
   user recommendations presented to the user;
   backgrounds presented to the user;
   background audio presented to the user;
   avatars and/or icons presented to the user;
   highlighting mechanisms used and highlighted components presented to the user;
   support mechanisms presented to the user;
   marketing devices provided to the user;
   the timing of providing marketing devices to the user; and
   off-line supplemental actions and recommendations provided to the user.

22. The method for building and utilizing interactive software system predictive models using biometric data of claim 12, wherein the customized interactive software system user experience is presented to the user via at least one computing system selected from the group of computing systems consisting of:
   a server computing system;
   a workstation;
   a desktop computing system;
   a user wearable computing system; and
   a mobile computing system.

23. The method for building and utilizing interactive software system predictive models using biometric data of claim 12, wherein determining that a current user of the interactive software system is a user of one of the identified user categories is based, at least in part, on biometric data initially collected from the current user.

24. The method for building and utilizing interactive software system predictive models using biometric data of claim 12, wherein determining that a current user of the interactive software system is a user of one of the identified user categories is based, at least in part, on demographic data collected from the current user.

25. The method for building and utilizing interactive software system predictive models using biometric data of claim 12, wherein determining that a current user of the interactive software system is a user of one of the identified user categories is based, at least in part, on personality data acquired from the user's own characterization of themselves.

26. The method for building and utilizing interactive software system predictive models using biometric data of claim 12, wherein determining that a current user of the interactive software system is a user of one of the identified user categories is based, at least in part, on income data associated with the current user.

27. A method for building a tax preparation related model using biometric data comprising:
   providing a tax preparation system;
   defining biometric data to be obtained and analyzed;
   providing one or more biometric data collection systems to obtain the defined biometric data;
   monitoring a user's interaction with the tax preparation system and obtaining user interaction activity data indicating the user's interaction with the tax preparation system at defined times;
   using the one or more biometric data collection systems to obtain biometric data associated with the user at defined times as the user interacts with the tax preparation system;
   correlating the biometric data associated with the user with the user's interaction activity data at the defined times;
   obtaining baseline data associated with the user, the baseline data including data indicating when the baseline data was obtained;
   analyzing the biometric data associated with the user and correlated to the user's interaction activity data and the baseline data, to generate emotional pattern predictive model data representing an emotional pattern predictive model associated with the user.

28. The method for building and utilizing tax preparation system related models using biometric data of claim 27, wherein the tax preparation system is selected from the group of tax preparation systems consisting of:
   a computing system implemented tax preparation software system;
   a network accessed tax preparation software system;
   a web-based tax preparation software system; and
   a cloud-based tax preparation software system.

29. The method for building and utilizing tax preparation system related models using biometric data of claim 27, wherein the biometric data includes at least one of the biometric data selected from the group of biometric data consisting of:
   data acquired from measuring the user's heart beat;
   data acquired from measuring the user's eye rotation;
   data acquired from measuring the user's eye dilation;

data acquired from measuring the user's skin color;
data acquired from measuring the user's perspiration;
data acquired from measuring the user's respiration;
data acquired from measuring the user's oxygen saturation;
data acquired from measuring the user's blood pressure
data acquired from measuring the user's skin temperature;
data acquired from measuring the user's muscle tension;
data acquired from measuring the user's neural activity;
data acquired from measuring the user's eye blinking;
data acquired from measuring the user's facial expression;
data acquired from measuring the user's voice and/or speech; and
data acquired from measuring the user's interactions with hardware associated with the user's interaction with the tax preparation system.

30. The method for building and utilizing tax preparation system related models using biometric data of claim 27, wherein an emotional state of the user at a given time is determined based on the biometric data received at that given time and includes at least one of the emotional states selected from the group of emotional states consisting of:
a happy emotional state or happiness;
a sad emotional state or sadness;
a surprised emotional state or surprise;
a fearful emotional state or fear;
a disgusted emotional state or disgust;
an angry emotional state or anger;
a tense emotional state;
a nervous emotional state;
a stressed emotional state;
an upset emotional state;
a frustrated emotional state;
a depressed emotional state;
a bored emotional state;
a fatigued emotional state;
an alert emotional state;
an excited emotional state;
an elated emotional state;
a happy emotional state;
a contented emotional state;
a serene emotional state;
a relaxed emotional state; and
a calm emotional state.

31. The method for building and utilizing tax preparation system related models using biometric data of claim 27, wherein the biometric data associated with a user is obtained continuously as the user interacts with the tax preparation system.

32. The method for building and utilizing tax preparation system related models using biometric data of claim 27, wherein the biometric data associated with a user is obtained on a periodic basis and/or at specific locations within the tax preparation system as the user interacts with the tax preparation system.

33. The method for building and utilizing tax preparation system related models using biometric data of claim 27, wherein the baseline data includes manual feedback data obtained from the user via user responses to one or more questions provided to the user.

34. The method for building and utilizing tax preparation system related models using biometric data of claim 33, wherein the manual feedback data obtained from the user is combined with additional baseline data associated with the user to create reference set data for the user.

35. The method for building and utilizing tax preparation system related models using biometric data of claim 34, wherein the additional baseline data associated with the user includes one or more of:
data acquired from the user's own characterization of his or her emotional state;
data acquired from historical user data; and
data acquired from a segment of users having characteristics comparable to the user.

36. The method for building and utilizing tax preparation system related models using biometric data of claim 27, wherein modifying one or more features and/or supporting systems associated with the tax preparation system to customize an tax preparation system user experience to the user includes modifying one or more of the following:
a sequence with which interview questions are presented to the user;
content or topics of the interview questions that are presented to the user;
font sizes used while presenting information to the user;
length of descriptions provided to the user;
themes presented to the user;
categories of icons displayed to the user;
categories of interface formats presented to the user;
interface displays presented to the user;
interface devices suggested to the user;
images displayed to the user;
assistance resources listed and/or recommended to the user;
when assistance resources are offered/provided to the user;
wording used in the tax preparation system;
ordering of interactions used in the tax preparation system;
user recommendations presented to the user;
backgrounds presented to the user;
background audio presented to the user;
avatars and/or icons presented to the user;
highlighting mechanisms used and highlighted components presented to the user;
support mechanisms presented to the user;
marketing devices provided to the user;
the timing of providing marketing devices to the user; and
off-line supplemental actions and recommendations provided to the user.

37. The method for building and utilizing tax preparation system related models using biometric data of claim 27, wherein the customized tax preparation system user experience is presented to the user via at least one computing system selected from the group of computing systems consisting of:
a server computing system;
a workstation;
a desktop computing system;
a user wearable computing system; and
a mobile computing system.

38. A method for building and utilizing tax preparation system related models using biometric data comprising:
providing a tax preparation system;
defining biometric data to be obtained and analyzed;
providing one or more biometric data collection systems to obtain the defined biometric data;
monitoring two or more users' interaction with the tax preparation system and obtaining user interaction activity data indicating the users' interaction with the tax preparation system at defined times;

using the one or more biometric data collection systems to obtain biometric data associated with the users at defined times as the users interact with the tax preparation system;

correlating the biometric data associated with the users with the users' interaction activity data at the defined times;

obtaining baseline data associated with the users, the baseline data including data indicating when the baseline data was obtained;

analyzing the biometric data associated with the users and correlated to the users' interaction activity data and the baseline data from the users, to generate emotional pattern predictive model data representing an emotional pattern predictive model associated with each of the users;

analyzing the emotional pattern predictive model data representing the emotional pattern predictive models associated with each of the users to identify one or more user categories;

identifying one or more user categories;

for each user category identified, aggregating and analyzing the emotional pattern predictive model data associated with each of the users of that identified user category to generate user category emotional pattern profile data for that user category;

determining that a current user of the tax preparation system is a user of one of the identified user categories and associating that user category with the current user;

monitoring the current user's interaction with the tax preparation system and obtaining current user interaction activity data indicating the current user's interaction with the tax preparation system at defined times;

using the one or more biometric data collection systems to obtain biometric data associated with the current user at defined times as the current user interacts with the tax preparation system;

correlating the biometric data associated with the current user with the current user's location and/or activity within the tax preparation system;

comparing the biometric data associated with the current user correlated to the current user's interaction activity data with the user category emotional pattern profile data for the user category associated with the current user; and if a deviation is found between the biometric data associated with the current user correlated to the current user's interaction activity data with the user category emotional pattern profile data for the user category associated with the current user, modifying one or more features and/or supporting systems associated with the tax preparation system to customize an tax preparation system user experience to the current user; and presenting the customized tax preparation system user experience to the current user.

39. The method for building and utilizing tax preparation system related models using biometric data of claim 38, wherein the tax preparation system is selected from the group of tax preparation systems consisting of:
  a computing system implemented tax preparation software system;
  a network accessed tax preparation software system;
  a web-based tax preparation software system; and
  a cloud-based tax preparation software system.

40. The method for building and utilizing tax preparation system related models using biometric data of claim 38, wherein the biometric data includes at least one of the biometric data selected from the group of biometric data consisting of:
  data acquired from measuring the user's heart beat;
  data acquired from measuring the user's eye rotation;
  data acquired from measuring the user's eye dilation;
  data acquired from measuring the user's skin color;
  data acquired from measuring the user's perspiration;
  data acquired from measuring the user's respiration;
  data acquired from measuring the user's oxygen saturation;
  data acquired from measuring the user's blood pressure
  data acquired from measuring the user's skin temperature;
  data acquired from measuring the user's muscle tension;
  data acquired from measuring the user's neural activity;
  data acquired from measuring the user's eye blinking;
  data acquired from measuring the user's facial expression;
  data acquired from measuring the user's voice and/or speech; and
  data acquired from measuring the user's interactions with hardware associated with the user's interaction with the tax preparation system.

41. The method for building and utilizing tax preparation system related models using biometric data of claim 38, wherein an emotional state of the user at a given time is determined based on the biometric data received at that given time and includes at least one of the emotional states selected from the group of emotional states consisting of:
  a happy emotional state or happiness;
  a sad emotional state or sadness;
  a surprised emotional state or surprise;
  a fearful emotional state or fear;
  a disgusted emotional state or disgust;
  an angry emotional state or anger;
  a tense emotional state;
  a nervous emotional state;
  a stressed emotional state;
  an upset emotional state;
  a frustrated emotional state;
  a depressed emotional state;
  a bored emotional state;
  a fatigued emotional state;
  an alert emotional state;
  an excited emotional state;
  an elated emotional state;
  a happy emotional state;
  a contented emotional state;
  a serene emotional state;
  a relaxed emotional state; and
  a calm emotional state.

42. The method for building and utilizing tax preparation system related models using biometric data of claim 38, wherein the biometric data associated with a current user is obtained continuously as the current user interacts with the tax preparation system.

43. The method for building and utilizing tax preparation system related models using biometric data of claim 38, wherein the biometric data associated with a current user is obtained on a periodic basis and/or at specific locations within the tax preparation system as the current user interacts with the tax preparation system.

44. The method for building and utilizing tax preparation system related models using biometric data of claim 38, wherein the baseline data is manual feedback data obtained from the user via user responses to one or more questions provided to the user.

45. The method for building and utilizing tax preparation system related models using biometric data of claim 44, wherein the manual feedback data obtained from the user is combined with additional baseline data associated with the user to create reference set data for the user.

46. The method for building and utilizing tax preparation system related models using biometric data of claim 45, wherein the additional baseline data associated with the user includes one or more of:
- data acquired from the user's own characterization of his or her emotional state;
- data acquired from historical user data; and
- data acquired from a segment of users having characteristics comparable to the user.

47. The method for building and utilizing tax preparation system related models using biometric data of claim 38, wherein modifying one or more features and/or supporting systems associated with the tax preparation system to customize an tax preparation system user experience to the user includes modifying one or more of the following:
- a sequence with which interview questions are presented to the user;
- content or topics of the interview questions that are presented to the user;
- font sizes used while presenting information to the user;
- length of descriptions provided to the user;
- themes presented to the user;
- categories of icons displayed to the user;
- categories of interface formats presented to the user;
- interface displays presented to the user;
- interface devices suggested to the user;
- images displayed to the user;
- assistance resources listed and/or recommended to the user;
- when assistance resources are offered/provided to the user;
- wording used in the tax preparation system;
- ordering of interactions used in the tax preparation system;
- user recommendations presented to the user;
- backgrounds presented to the user;
- background audio presented to the user;
- avatars and/or icons presented to the user;
- highlighting mechanisms used and highlighted components presented to the user;
- support mechanisms presented to the user;
- marketing devices provided to the user;
- the timing of providing marketing devices to the user; and
- off-line supplemental actions and recommendations provided to the user.

48. The method for building and utilizing tax preparation system related models using biometric data of claim 38, wherein the customized tax preparation system user experience is presented to the user via at least one computing system selected from the group of computing systems consisting of:
- a server computing system;
- a workstation;
- a desktop computing system;
- a user wearable computing system; and
- a mobile computing system.

49. The method for building and utilizing tax preparation system related models using biometric data of claim 38, wherein determining that a current user of the tax preparation system is a user of one of the identified user categories is based, at least in part, on biometric data initially collected from the current user.

50. The method for building and utilizing tax preparation system related models using biometric data of claim 38, wherein determining that a current user of the tax preparation system is a user of one of the identified user categories is based, at least in part, on demographic data collected from the current user.

51. The method for building and utilizing tax preparation system related models using biometric data of claim 38, wherein determining that a current user of the tax preparation system is a user of one of the identified user categories is based, at least in part, on personality data acquired from the user's own characterization of themselves.

52. The method for building and utilizing tax preparation system related models using biometric data of claim 38, wherein determining that a current user of the tax preparation system is a user of one of the identified user categories is based, at least in part, on income data associated with the current user.

* * * * *